(12) United States Patent
Kim et al.

(10) Patent No.: US 8,219,692 B2
(45) Date of Patent: Jul. 10, 2012

(54) METHOD AND APPARATUS FOR STORING AND RESTORING STATE INFORMATION OF REMOTE USER INTERFACE

(75) Inventors: Yoon-soo Kim, Suwon-si (KR); In-pyo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 11/654,616

(22) Filed: Jan. 18, 2007

(65) Prior Publication Data

US 2007/0174301 A1    Jul. 26, 2007

(30) Foreign Application Priority Data

Jan. 18, 2006    (KR) ........................ 10-2006-0005575

(51) Int. Cl.
    *G06F 15/16* (2006.01)
(52) U.S. Cl. ........................................ 709/228; 709/227
(58) Field of Classification Search .................. 709/227, 709/228; 707/10
    See application file for complete search history.

(56) References Cited

U.S. PATENT DOCUMENTS

| | | | |
|---|---|---|---|
| 6,792,466 B1 | 9/2004 | Saulpaugh et al. | |
| 2002/0087657 A1* | 7/2002 | Hunt | 709/217 |
| 2002/0194262 A1* | 12/2002 | Jorgenson | 709/203 |
| 2003/0061275 A1* | 3/2003 | Brown et al. | 709/203 |
| 2005/0022210 A1 | 1/2005 | Zintel et al. | |
| 2005/0066037 A1 | 3/2005 | Song et al. | |
| 2006/0248200 A1* | 11/2006 | Stanev | 709/227 |
| 2007/0244880 A1* | 10/2007 | Martin et al. | 707/5 |

FOREIGN PATENT DOCUMENTS

| | | | |
|---|---|---|---|
| JP | 2000020472 A | | 1/2000 |
| JP | 2004501428 A | | 1/2004 |
| JP | 2004-062873 A | | 2/2004 |
| KR | 10-2004-0074489 A | | 8/2004 |
| WO | 2004/088543 A1 | | 10/2004 |

OTHER PUBLICATIONS

Communication from Japanese Patent Office issued in Application No. 2007-003886; on Nov. 8, 2011.
Song H et al: "Browser state repository service", Lecture Notes in Computer Science, Springer Verlag, Berlin, DE, vol. 2414, 2002, pp. 1-14.
Communication dated Mar. 21, 2012 issued by the Japanese Patent Office in Japanese Application No. 2007003886.

* cited by examiner

*Primary Examiner* — Djenane M Bayard
*Assistant Examiner* — Umar Cheema
(74) *Attorney, Agent, or Firm* — Sughrue Mion, PLLC

(57) ABSTRACT

An apparatus and method are provided for restoring a remote user interface (RUI) in a Universal Plug and Play (UPnP) environment. In the method, a client receiving an RUI from a server, requests that the state information of the RUI be saved. The method includes obtaining state information generated when the RUI is used, and requesting that the obtained state information be saved. Accordingly, it is possible to apply a method of storing and restoring state information of a remote user interface, in a UPnP environment, to an HTTP-based remote protocol model having stateless characteristics which do not allow state information of a remote user interface to be stored.

32 Claims, 23 Drawing Sheets

○ Instantiation:
<object classid="http://schemas.cea.org/CEA2014/StatesStorage" name="srh">...</object> or
var ssh = new StatesStorage();
○ Properties:
  ○ Array urls: read-only. When read, returns array for URLs for SSS with save feature. The returned URLs for SAVE command SHALL be of format of http://SSS-IP-ADDR:PORT/SAVE. JavaScript SHALL add additional argument, say, ?__name__=NameForThePageToBeSaved
  ○ Array names: read-only. When read, returns array for values of <friendlyName> in RUIS device description for RUIS' with save feature. Each element in urls and names SHALL have same subscript for same RUIS
○ Methods:
  ○ none

FIG. 5

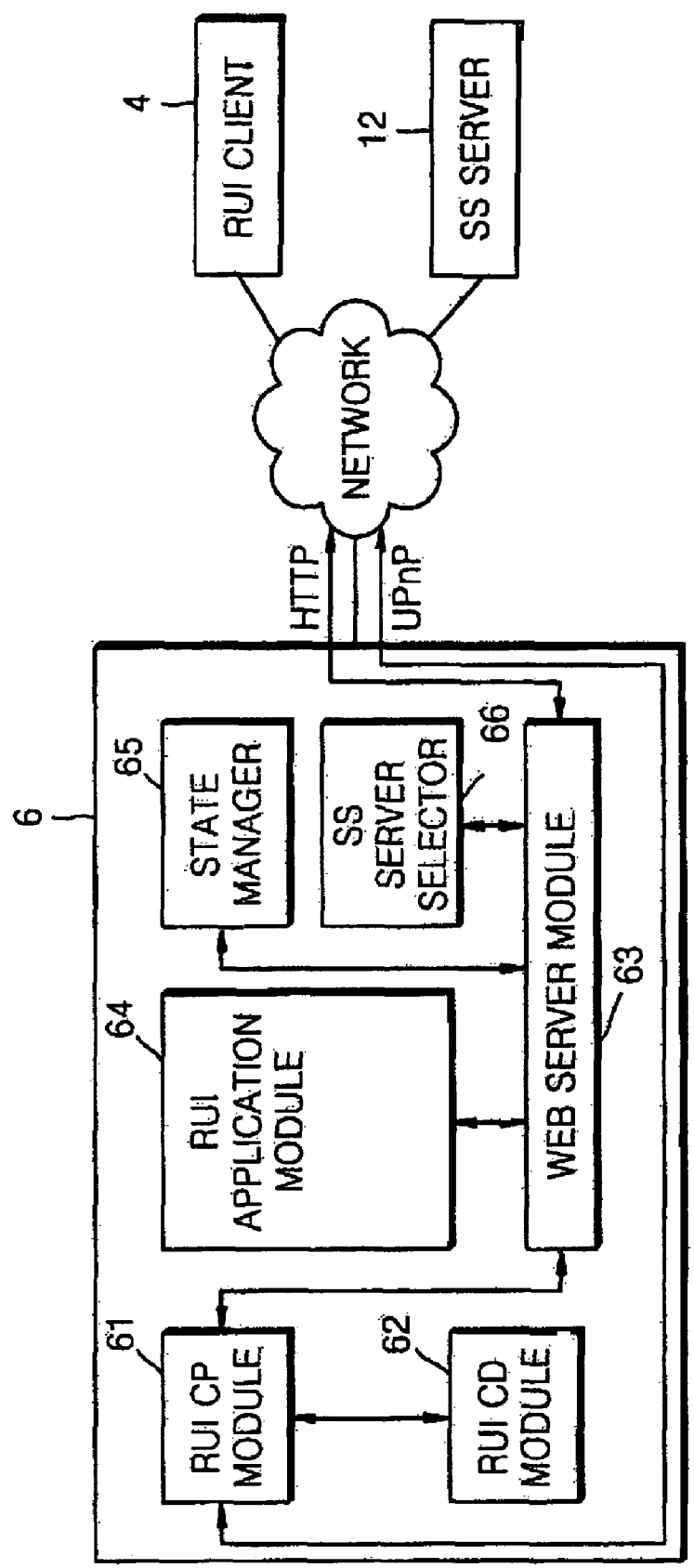

FIG. 8

```
<HTML>
<HEAD>
<TITLE>RUI DEMO</TITLE>
</HEAD>
<FRAMESET ROWS="100%,*" COLS="1*" BORDER="0">
    <FRAME SRC="ruimain.html" NAME="main" SCROLLING="no" noresize frameborder="no">
    <FRAME SRC="ruicontrol.html" NAME="control" SCROLLING="no" noresize frameborder="no">
</FRAMESET>
</HTML>
```

FIG. 9

```
<HTML>
<HEAD>
<TITLE>RUI DEMO</TITLE>
<meta http-equiv="Content-Type" content="text/html; charset=euc-kr">
</HEAD>
<script language="JavaScript">
function savestate()
{
    if(!window.parent.control.document.form1)
        return;
    ## Optionally, execute GETSTATES command to get server-side states and set the value for __serverStates__
    window.parent.control.document.form2.submitctrl.click();
    ## Check if document for hidden frame is loaded
    window.parent.control.document.form1.__serverStates__.value
        = window.parent.control.document.form2.serverStates;
    window.parent.control.document.form1.submitctrl.click();
    return;
}
</script>
<BODY>
<table align=center>
    <tr>
        <td><input name="save" type="button" value="save" onclick="javascript:savestate()"></td>
    </tr>
</table>
<img src="editbx.gif" border="0" name="menu" class="drag" width=402 height=43>
</BODY>
</HTML>
```

FIG. 10

```
<HTML>
<HEAD><TITLE>RUI DEMO</TITLE>
<meta http-equiv="Content-Type" content="text/html; charset=euc-kr">
<object classid="http://schemas.cea.org/CEA2014/StatesStorage" name="srh"></object>
</HEAD>
<script language="JavaScript">
function save()
{
    var targetElement = window.parent.main.document.menu;
    document.form1.xpos.value = targetElement.style.pixelLeft;
    document.form1.ypos.value = targetElement.style.pixelTop;
    selectRUIS();
    document.form1.submit();
}
function selectSSS()
{
    Array urls = document.srh.urls;
    Array names = document.srh.names;
    ## open a window for selection of a specific SSS
    document.form1.action = selectedurl;
}
</script>
<BODY>
<FORM name="form1" method="post" action="" >
<input type="hidden" name="xpos" value="0">
<input type="hidden" name="ypos" value="0">
<input type="hidden" name="__frameName__" value="main">
<input type="hidden" name="__hiddenFrameURL__" value="http://10.10.10.10/index.html">
<!-- For SSS to reload the original hidden frame -->
<input type="hidden" name="__url__" value="http://10.10.10.10/index.html">
<input type="hidden" name="__serverStates__" value="">
<input type="hidden" name="submitctrl" onclick="save()">
</FORM>
<FORM name="form2" method="get" action="http://10.10.10.10/GETSTATES">
<input type="hidden" name="serverStates" value="">
<input type="hidden" name="submitctrl"></FORM>
</BODY>
</HTML>
```

FIG. 11

```
<HTML>
...
<script language="JavaScript">
function getstatesandselect()
{
    if(!window.parent.control.document.form1)
        return;
    ## Optionally, execute GETSTATES command to get server-side states and set the value for __serverStates
    window.parent.control.document.form2.submitctrl.click();
    ## Check if document for hidden frame is loaded
    window.parent.control.document.form1.__serverStates__.value
        = window.parent.control.document.form2.serverStates;
    window.open("URL_For_SSS_Selector", "_blank", "toolbar=no, location=no, directories=no, status=no, menubar=no, scrollbars=no, resizable=no, copyhistory=no, width=400, height=400");
    return;
}
function setsssurl(url)
{
    window.parent.control.document.form1.action = url;
    savestate();
}
function savestate()
{
    window.parent.control.document.form1.submitctrl.click();
}
</script>
<BODY>
<table align=center>
<tr>
    <td><input name="save" type="button" value="save" onclick="javascript:getstateandselect()"></td>
</tr>
</table>
<img src="editbx.gif" border="0" name="menu" class="drag" width=402 height=43>
</BODY>
</HTML>
```

FIG. 14

```
<HTML>
<HEAD>
<TITLE>RUI DEMO</TITLE>
</HEAD>
<FRAMESET ROWS="100%,*" COLS="1*" BORDER="0">
    <FRAME SRC="http://10.10.10.10/EPG?ValueFor_serverStates   \
&_statesAccessPrefix_=window.parent.parent.savedstates.document.form
1"   \
NAME="originalpage" SCROLLING="no" noresize frameborder="no">
    <FRAME SRC="/_RESTORE_?name=\
EPG%20saved%20at%20%83A00PM%2019-12-05"   \
NAME="savedstates" SCROLLING="no" noresize frameborder="no">
</FRAMESET>
</HTML>
```

```
<HTML>
<BODY>
<FORM name="form1">
<input type="hidden" name="xpos" value="24">
<input type="hidden" name="ypos" value="35">
</FORM>
</BODY>
</HTML>
```

FIG. 17

```
<HTML>
<HEAD>
<TITLE>RUI DEMO</TITLE>
</HEAD>
<script language="JavaScript">
function restorestate()
{
    if(!window.parent.parent.savedstates.document.form1)
        return;
    document.menu.style.pixelLef = window.parent.parent.savedstates.document.form1.xpos.value;
    document.menu.style.pixelTop = window.parent.parent.savedstates.document.form1.ypos.value;
    return;
}
</script>
<BODY onload="javascript:restorestate()">
<table align=center>
    <tr>
        <td><input name="save" type="button" value="save"></td>
    </tr>
</table>
<img src="editbx.gif" border="0" name="menu" class="drag" width=402 height=43>
</BODY>
</HTML>
```

METHOD AND APPARATUS FOR STORING AND RESTORING STATE INFORMATION OF REMOTE USER INTERFACE

CROSS-REFERENCE TO RELATED PATENT APPLICATION

This application claims priority from Korean Patent Application No. 10-2006-0005575, filed on Jan. 18, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to restoring state information of a remote user interface (RUI), and more particularly, to restoring an RUI in a Universal Plug and Play (UPnP) environment.

2. Description of the Related Art

FIG. 1 is a block diagram of a related art Universal Plug and Play (UPnP)-based remote user interface (RUI) network system ("the system"). Referring to FIG. 1, the system includes an RUI control point (CP) 11, an RUI client 12, and an RUI server 13. Here, the RUI CP 11 corresponds to a UPnP CP supporting a remote user interface, and the RUI client 12 and the RUI server 13 correspond to a UPnP controlled devices (CD) supporting the remote user interface.

According to UPnP, the RUI CP 11 discovers and controls the RUI client 12 and the RUI server 13. The RUI client 12 and the RUI server 13 that are connected under the control of the RUI CP 11, process a request and a response received via an RUI according to out-of-band remote protocol, such as remote desktop protocol (RDP) and extended remote technology (XRT) protocol.

FIG. 2 is a diagram illustrating a related art process of storing and restoring state information of an RUI according to UPnP. In particular, the process of FIG. 2 is related to a case where a connection of a first RUI client 22 to an RUI server 24 is changed to a connection of a second RUI client 23 to the RUI server 24.

In operation 201, the RUI CP 21 searches for RUI connections that are currently in progress by calling GetCurrentConnection( ) to the first RUI client 22, and learns a connection to the RUI server 24 from the searched RUI connections.

In operation 202, the RUI CP 21 calls SetUILifetime( ) to the RUI server 24 in order to instruct the RUI server 24 to maintain the RUI connections that are currently in progress, for a predetermined time.

In operation 203, the RUI CP 21 calls Disconnect( ) to the first RUI client 22 in order to terminate the RUI connections that are in progress.

In operation 204, the RUI CP 21 calls Connect( ) to the second RUI client 23 in order to start the RUI connections maintained according to the instructions given in operation 202.

However, as described above, the conventional method of FIG. 2 is applicable only to a remote protocol model which allows all state information of RUIs to be stored in an RUI server. However, in the case of a HyperText Transfer Protocol (HTTP)-based remote protocol model, when a transaction that processes a request and a response is completed, the state information of a remote interface is lost and is not stored due to the stateless characteristics of the HTTP, and therefore, the RUI client manages most of the state information.

Accordingly, the conventional process of storing and restoring state information of an RUI according to UPnP is applicable to remote protocol models, such as RDP and XRT, in which all state information of RUIs is stored in an RUI server. However, the conventional process has a problem in that it cannot be applied to remote protocol models, such as HTTP, in which most of the state information is managed by an RUI client. In particular, binary protocol-based RDP and XRT need a wider network bandwidth than HTTP. Therefore, since an HTTP-based RUI is widely used, the above problem has emerged as a very important issue.

SUMMARY OF THE INVENTION

The present invention provides a method and an apparatus for allowing a process of storing and restoring state information of an RUI in a UPnP environment, to be applied to an HTTP-based remote protocol model, having stateless characteristics, that does not allow state information of an RUI to be stored.

The present invention also provides a computer readable recording medium having recorded thereon a program for executing the method.

According to an aspect of the present invention, there is provided a method of allowing a client, which receives the remote user interface from a server, to request that state information of a remote user interface be saved, the method comprising obtaining state information generated when the remote user interface is used, and requesting that the obtained state information be saved.

According to another aspect of the present invention, there is provided a computer readable medium having recorded thereon a program for executing the method of requesting that state information regarding a remote user interface be saved.

According to another aspect of the present invention, there is provided an apparatus for allowing a client, which uses the remote user interface received from a server, to request that state information of a remote user interface be saved, the apparatus comprising a remote user interface control point module obtaining information of a storage server providing storage for saving the state information, and a web browser requesting the storage server to save the state information, based on the information about the storage server obtained by the remote user interface control point module.

According to another aspect of the present invention, there is provided a method of restoring state information of a remote user interface by using a client which receives the remote user interface from a server, the method comprising obtaining state information generated when the remote user interface is used, and reflecting the obtained state information in the remote user interface.

According to another aspect of the present invention, there is provided a computer readable medium having recorded thereon a program for executing the method of restoring state information of a remote user interface.

According to another aspect of the present invention, there is provided an apparatus for allowing a client, which receives the remote user interface from a server, to restore state information of a remote user interface, the apparatus comprising a remote user interface control point module obtaining information of a storage server providing storage which stores the state information, and a web browser obtaining the state information from the storage server based on the information about the storage server, which is obtained by the remote user interface control point module, and reflecting the obtained state information in the remote user interface.

BRIEF DESCRIPTION OF THE DRAWINGS

The above and other aspects of the present invention will become more apparent from the following description of exemplary embodiments thereof with reference to the accompanying drawings, in which:

FIG. 5 illustrates syntax representing an interface of a State Storage (SS) handler according to an exemplary embodiment of the present invention;

FIG. 6 is a block diagram of an RUI server according to an exemplary embodiment of the present invention;

FIG. 8 illustrates an example of the syntax representing the savable page illustrated in FIG. 7;

FIG. 9 illustrates an example of the syntax representing a main page illustrated in FIG. 7;

FIG. 10 illustrates an example of the syntax representing a states saving page illustrated in FIG. 7;

FIG. 11 illustrates another example of the syntax representing the main page illustrated in FIG. 7;

FIG. 14 illustrates an example of the syntax representing the restoring page illustrated in FIG. 13;

FIG. 17 is an example of the syntax representing an original page to be loaded into a main page window of FIG. 15;

DETAILED DESCRIPTION OF EXEMPLARY EMBODIMENTS OF THE PRESENT INVENTION

Hereinafter, exemplary embodiments of the present invention will be described in detail with reference to the accompanying drawings. In this disclosure, an RUI based on an HTTP which is a stateless protocol that does not store state information, will be described with respect to a web page containing an HTTP object which is a Java script object that processes an HTTP request without reloading the web page. However, it would be apparent to those of ordinary skill in the technical field to which the present invention pertains that the present invention and the exemplary embodiments are applicable to other types of remote user interfaces, and not just the web page.

Figure 1:
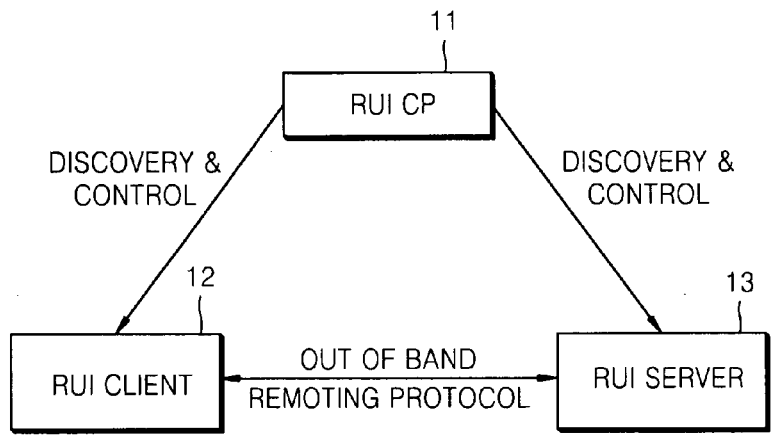
FIG. 1 is a block diagram of a related art Universal Plug and Play (UPnP)-based remote RUI network system.
Figure 2:
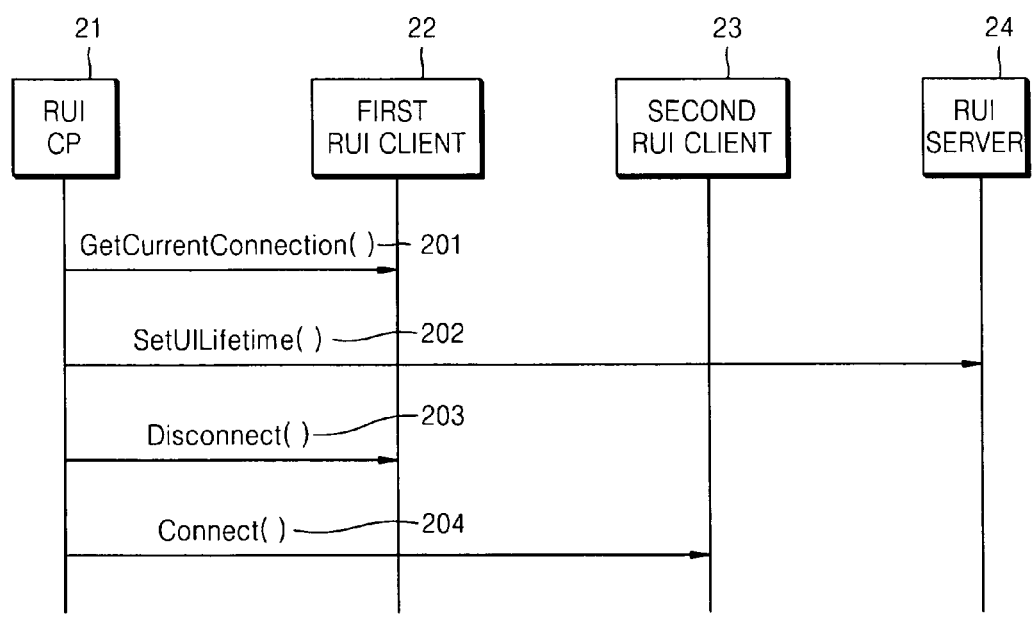
FIG. 2 is a diagram illustrating a related art process of storing and restoring state information of an RUI according to UPnP.
Figure 3:
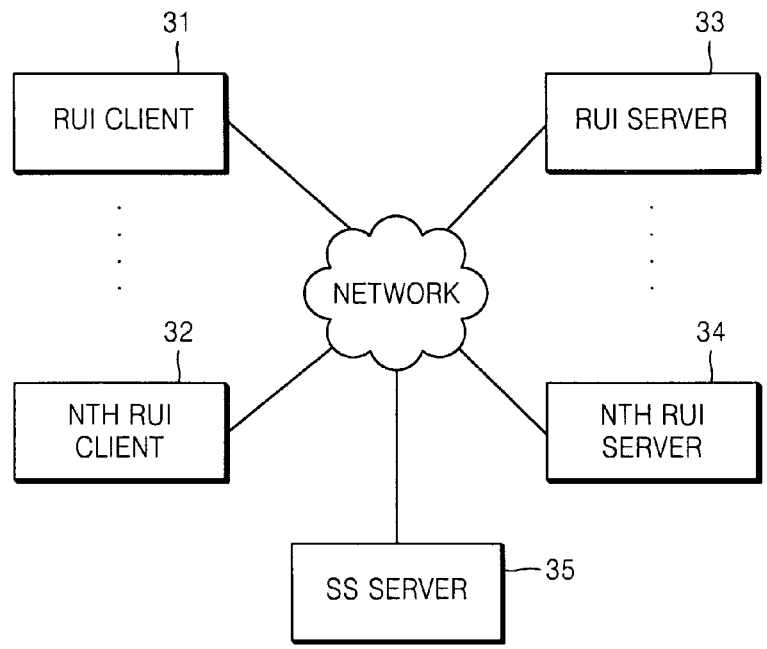
FIG. 3 is a block diagram of a UPnP-based RUI network system according to an exemplary embodiment of the present invention.

FIG. 3 is a block diagram of a UPnP-based RUI network system ("the system") according to an exemplary embodiment of the present invention. Referring to FIG. 3, the system includes RUI clients 31 and 32, RUI servers 33 and 34, and a State Storage (SS) server 35. In particular, the SS server 35 is a server that provides a state storage for storing the state information of an RUI. Also, the RUI clients 31 and 32 and the RUI servers 33 and 34 are 2-box models, each having a built-in RUI control point (CP) module and acquiring information regarding the SS server 35 during UPnP discovery. However, the RUI clients 31 and 32 and the RUI servers 33 and 34 do not need to have the built-in RUI CP module, and can receive the information regarding the SS server 35 from another node in this case.

Figure 4:
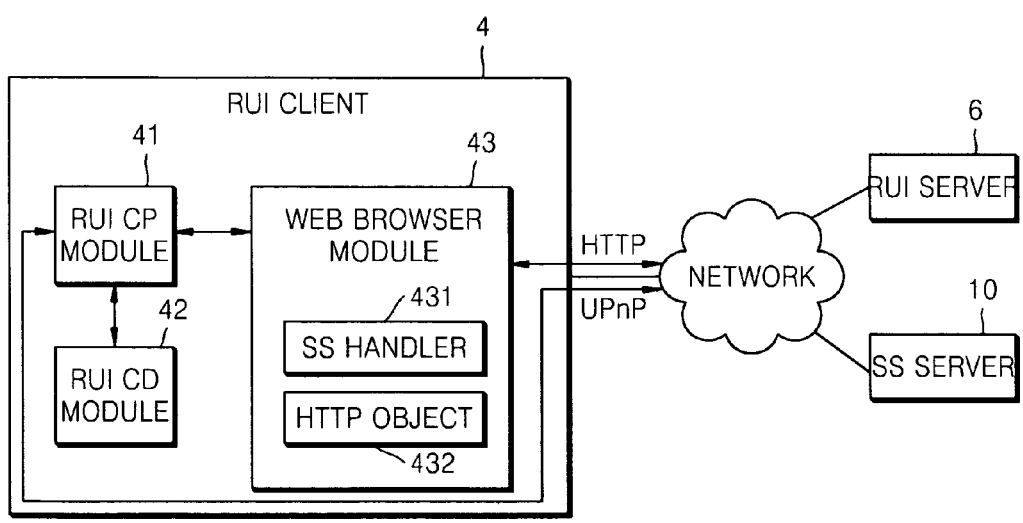
FIG. 4 is a block diagram of an RUI client according to an exemplary embodiment of the present invention.

FIG. 4 is a block diagram of an RUI client 4 according to an exemplary embodiment of the present invention. Referring to FIG. 4, the RUI client 4 includes an RUI CP module 41, an RUI controlled device (CD) module 42, and a web browser module 43. In particular, the RUI CP module 41 and the RUI CD module 42 are optional modules needed when the RUI client 4 is located in an autonomous network, such as a home network, to which UPnP is applicable. Also, the RUI CP module 41 may be located outside the RUI client 4, instead of inside thereof.

The RUI CP module 41 acts as a UPnP CP that discovers and controls UPnP CDs. In particular, according to an exemplary embodiment of the present invention, the RUI CP module 41 acquires information, based on UPnP, regarding an SS server 10 during discovery of an RUI server 6 and an SS server 10 which are CDs based on UPnP. Also, the RUI CP module 41 provides the information regarding the SS server 10 to an SS handler 431 in order to request that state information of a remote interface, i.e., a web page, be stored.

The RUI client 4 may include "<hasControlPoint>true</hasControlPoint>", indicating that it has the RUI CP module 41, in an HTTP header.

The RUI CD module 42 advertises that it is a UPnP CD, and acts as a UPnP CD to be controlled by a UPnP CP that discovers the RUI CD module 42 in response to the advertisement.

The web browser module 43 acts as an HTTP-based general web browser. That is, the web browser module 43 is a client module that receives a request for a web page from a user, transmits the request to the RUI server 6 having a web server, performs rendering of the web page acquired in response to the request, and displays the rendering result.

In particular, the web browser module 43 may include the SS handler 431 therein or in the form of a plug-in. The SS handler 431 is an optional module needed only when the RUI CP module 41 is present. The RUI CP module 41 and the SS handler 431 are capable of establishing internal communications via interprocess communication (IPC) or a UNIX domain socket. When receiving the HTTP header and realizing that the RUI client 4 includes the RUI CP module 41, the RUI server 6 may provide a savable page, illustrated in FIG. 7, which is represented by a Java script using the SS handler 431 to obtain the information regarding the SS server 10. That is, when the Java script is executed, the SS handler 431 obtains the information regarding the SS server 10 from the RUI CP module 41, and provides the obtained information to a states saving page 82, illustrated in FIG. 7, when there is a request for the states saving page 82.

Figure 7:
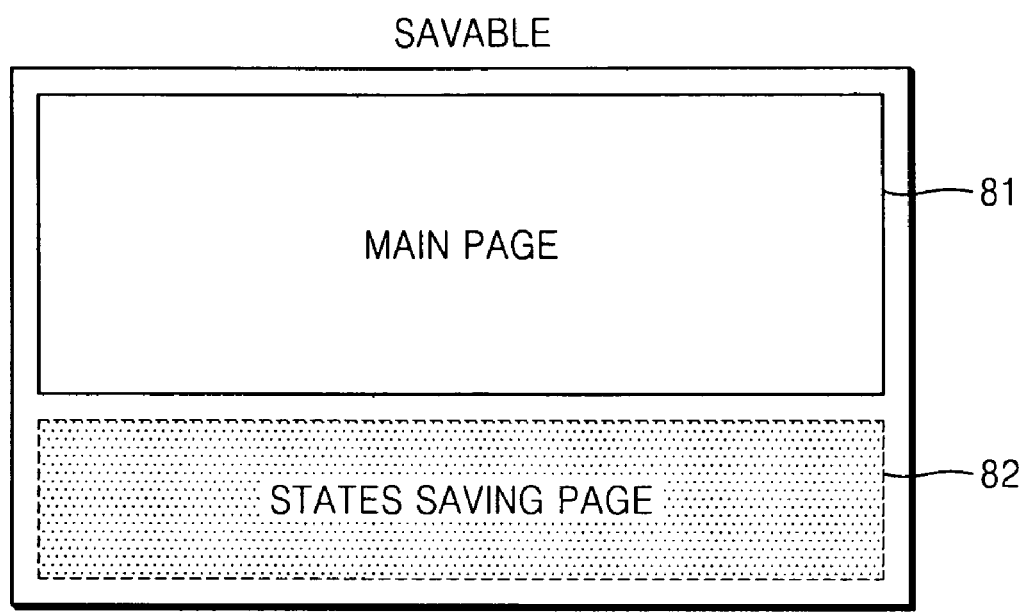
FIG. 7 is a block diagram of a savable page according to an exemplary embodiment of the present invention.
Figure 18:
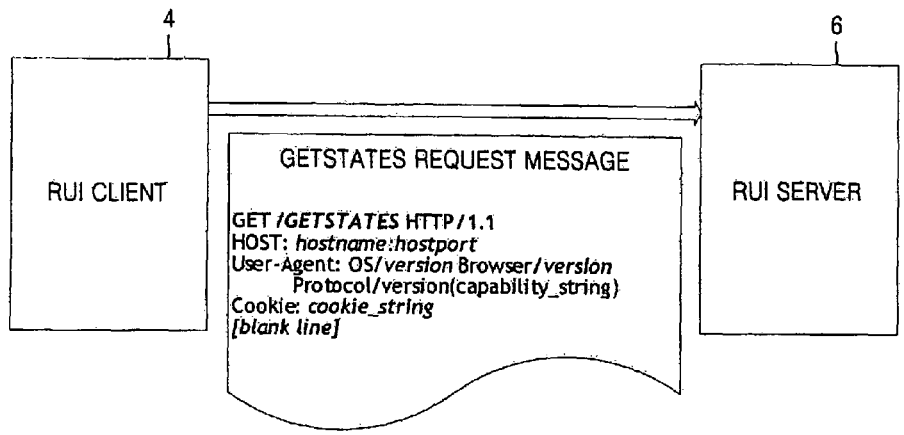
FIG. 18 illustrates the format of a GETSTATES request message according to an exemplary embodiment of the present invention.

The web browser module 43 receives the savable page illustrated in FIG. 7 from the RUI server 6. Also, when receiving from the user a command to save state information regarding an RUI, that is, when the user clicks a "SAVE" button (not shown) on the main page 81 of the savable page, the web browser module 43 requests the state information regarding the RUI server 6, which is generated when the user uses the web page, in the case that a Java script included in the web page is executed in order to generate the state information of the RUI server 6. That is, the web browser module 43 transmits a GETSTATES request message, as illustrated in FIG. 18, to the RUI server 6.

Also, the web browser module 43 obtains the state information of the RUI server 6 in response to the request. That is, the web browser module 43 receives from the RUI server 6 a GETSTATES response message illustrated in FIG. 19 in response to the GETSTATES request message, and obtains the state information of the RUI server 6 by executing the Java script included in the web page. If the user uses a web page regarding product sales, information regarding a product that the user selects remains in the RUI server 6. Also, if the user uses a web page regarding user authentication, information regarding a result of user authentication remains in the RUI server 6. Such items of information are examples of the state information of the RUI server 6.

Also, the web browser module 43 executes the Java script included in the web page in order to read from the web page the state information of the RUI client 4, which is generated when the user uses the web page. While the user is using the web page, form input information, cookie information, state information of an audio/visual (AV) object corresponding to an input value of the user are generated. Such items of information are examples of the state information of the RUI client 4.

In order to request the SS server 10 to save the above generated information and the obtained state information of the web page, that is, the state information of the RUI client 4 and the RUI server 6, the web browser module 43 receives information regarding the SS server 10 from the RUI CP module 41 or an RUI CP module 61 (depicted in FIG. 6 and described below) of the RUI server 6. More specifically, the web browser module 43 may display a presentation page received from the RUI server 6 by executing the Java script in the web page in order to display the information of the SS server 10 to the user so that the user can select the SS server 10 as a storage server for storing the state information of the web page. Otherwise, the web browser module 43 may request the SS handler 431 to provide the information of the SS server 12, and display the obtained information to the user so that the user can select the SS server 10 as a storage server for storing the state information of the web page.

Also, the web browser module 43 executes the Java script in the web page in order to request the SS server 10 to save the state information of the web page by using the information of the SS server 10 selected by the user, i.e., a uniform resource locator (URL) of the SS server 10. That is, the web browser module 43 transmits a SAVE request message illustrated in FIG. 20 to the SS server 10. Also, the web browser module 43 receives a SAVE response message, illustrated in FIG. 21, which indicates that saving of the state information of the web page is completed, from the SS server 10.

Also, when receiving from the user a command to display a list of restoring pages for web pages, the web browser module 43 receives the information of the SS server 10 from the RUI CP module 41 or the RUI CP module 61 (shown in FIG. 6) of the RUI server 6. Also, the web browser module 43 requests the SS server 10 to provide the list of restoring pages by using the information of the SS server 10, i.e., the URL of the SS server 10. That is, the web browser module 43 transmits a restoring page request message illustrated in FIG. 22 to the SS server 10.

Also, the web browser module 43 obtains the list of restoring pages in response to the request. That is, the web browser module 43 receives from the SS server 10 a restoring page response message, illustrated in FIG. 23, in response to the restoring page request message, and obtains the list of restoring pages for web pages from the restoring page response message. Also, the web browser module 43 displays the list of restoring pages to the user so as to allow the user to select one from the list of restoring pages.

Also, the web browser module 43 requests the SS server 10 to provide the selected restoring page, and receives the selected restoring page as a response to the request. That is, the web browser module 43 transmits the restoring request message illustrated in FIG. 24 to the SS server 10, and receives a restoring response message illustrated in FIG. 25 as a response to the restoring request message.

Figure 13:
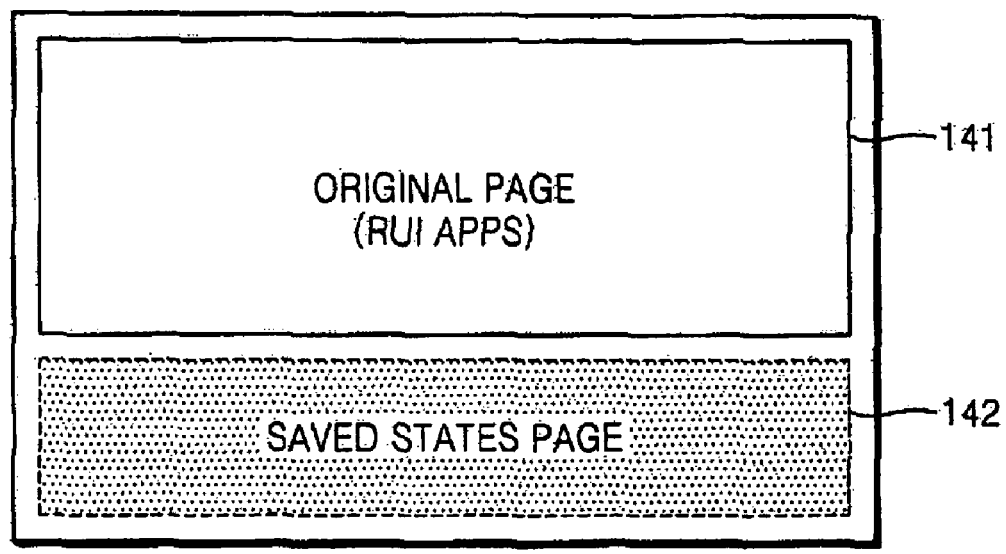
FIG. 13 is a block diagram of a restoring page according to an exemplary embodiment of the present invention.

Also, the web browser module 43 requests the SS server 10 to provide state information for the selected restoring page, and obtains the state information from a response to the request. The obtained state information includes the state information of the RUI server 6 obtained via the URL of an "originalpage" frame, as shown in FIG. 14, and the state information of the RUI client 4 in the form of a saved states page 142, as shown in FIG. 13. Also, the web browser module 43 requests the RUI server 6 to provide an original page 141, as shown in FIG. 13, and at the same time, provides the RUI server 6 with the state information of the RUI server 6 of the obtained state information so that the RUI server 6 can restore the state of the RUI server 6. That is, the web browser module 43 provides the RUI server 6 with a "ValueFor_ServerStates_" field of the restoring page, the syntax of which is shown in FIG. 14. In this case, the web browser module 43 also transmits information for access to the state information of the RUI client 4 shown in FIG. 16 to the RUI server 6 via a "statesAccessPrefix" field shown in FIG. 14.

Also, the web browser module 43 obtains as a response to the request the original page 141 containing a Java script for restoring the state of the RUI client 4. Also, the web browser module 143 executes the Java script in the original page 141 in order to reflect the executing result in the original page 141, thereby restoring the web page.

FIG. 5 illustrates syntax representing an interface of the SS handler 431 illustrated in FIG. 4 according to an exemplary embodiment of the present invention. Referring to FIG. 5, the interface of the SS handler 431 is based on a Java script. In particular, the interface of the SS handler 431 provides properties representing uniform resource locators (URLs) (array URLS) and names (array names) of the SS server 10.

FIG. 6 is a block diagram of the RUI server 6 illustrated in FIG. 4 according to an exemplary embodiment of the present invention. Referring to FIG. 6, the RUI server 6 includes an RUI CP module 61, an RUI CD module 62, a web server module 63, an RUI application module 64, a state manager 65, and an SS server selector 66. In particular, the RUI CP module 61 and the RUI CD module 62 are optional modules needed when the RUI server 6 is located in an autonomous network, such as a home network to which UPnP is applicable. Also, the RUI CP module 61 may be located outside the RUI server 6, instead of inside thereof.

The RUI CP module 61 acts as a UPnP CP that discovers and controls UPnP CDs. In particular, according to an exemplary embodiment of the present embodiment, when the RUI client 4 does not include the RUI CP module 41, the RUI CP module 61 obtains information of the SS server 10 during discovery of the SS server 10 according to the UPnP standard and provides it to the SS server selector 66.

The RUI CD module 62 advertises that it is a UPnP CD, and acts as a UPnP CD controlled by a UPnP CP that discovers the RUI CD module 62 according to the advertisement.

The web server module 63 acts as an HTTP-based general web server. That is, the web server module 63 is an HTTP server module that receives a request for an application from the RUI client 4, processes the application, and provides the result of processing in response to the request. In particular, when receiving a request for a general web page from the RUI client 4, the web server module 63 creates and provides a web page in response to the request.

The state manager 65, which manages the state information of the RUI server 6, is an optional module needed only when the state information of the RUI server 6 is generated when a user of the RUI client 4 uses an RUI application, i.e., a web page, which is provided by the RUI server 6. More specifically, when receiving from the RUI client 4 a request for the state information of the RUI server 6, generated when the user of the RUI client 4 uses a web page provided from the RUI server 6, the state manager 65 provides the state information of the RUI server 6 to the RUI client 4. That is, upon receiving the GETSTATES request message illustrated in FIG. 18 via the web server module 63, the state manager 65 transmits a GETSTATES response message illustrated in FIG. 19 in response to the GETSTATES request message.

Also, when receiving the state information of the RUI server 6 from the RUI client 4, the state manager 65 restores the state of the RUI server 6 based on the received information. That is, when receiving "ValueForServerStates_" in a restoring message illustrated in FIG. 14 from the RUI client 4, the state manager 65 restores the state of the RUI server 6 based on the "ValueForServerStates_".

The RUI application module 64 performs an application for a web page corresponding to an RUI remote user interface. More specifically, when receiving a request for a web page from the RUI client 4 via the web server module 63, the RUI application module 64 creates a savable page providing a unit, e.g., a "SAVE" button, via which the user can instruct that the state information of the web page is to be saved, and provides the savable page to the RUI client 4.

Also, when receiving from the RUI client 4 information for accessing the state information of the RUI client 4, i.e., "_StatesAccessPrefix_" in the restoring page, the syntax of which is shown in FIG. 14, the RUI application module 64 creates an original page containing a Java script for accessing the state information of the RUI client 4 in order to restore the state of the RUI client 4, and provides the original page to the RUI client 4.

The SS server selector 66 is an optional module needed only when the RUI CP module 61 is present. The SS server selector 66 creates a representation page displaying to a user information about the SS server 10 obtained by the RUI CP module 61, and provides the information to the RUI client 4. Also, as described above, when the user who recognizes the representation page selects the SS server 10, the SS server selector 66 provides a call window (not shown) with the information about the SS server 10 by using an opener object of the Java script.

FIG. 7 is a block diagram of a savable page according to an exemplary embodiment of the present invention. Referring to FIG. 7, the savable page includes a visible main page 81, and an invisible states saving page 82.

The main page 81 is visible to a user, and the user can input desired information thereto via a user interface and view the result. In particular, according to an exemplary embodiment of the present invention, the main page 81 contains a "SAVE" button (not shown), the use of which allows state information of RUIs to be saved.

The states saving page 82 is invisible to the user, and contains a Java script for storing the main page 81 in the SS server 10. When the user clicks the "SAVE" button, the information regarding the SS server 10 is obtained from the SS handler 431 of the RUI client 4 and the information of the RUIs is stored in the SS server 10 based on the obtained information, by using the states saving page 82.

FIG. 8 illustrates an example of the syntax representing the savable page illustrated in FIG. 7, which is an HyperText Markup Language (HTML) document in the form of a multi-frame. Referring to FIG. 8, the main page 81 is loaded into a frame named "main", and the states saving page 82 is loaded into a frame named "control". In particular, the "control" frame is a hidden frame, thereby preventing a user from viewing the states saving page 82.

FIG. 9 illustrates an example of the syntax representing the main page 81 illustrated in FIG. 7. Referring to FIG. 9, the main page 81 is an HTML document. When the "SAVE" button in the main page 81 is clicked, a Java script function "savestate( )" shown in FIG. 9, of the main page 81, is executed. Then, the "savestate( )" function accesses the "control" frame into which the states saving page 82 is loaded, via a "window.parent.control" object, and processes forms 1 and 2 of the "control" frame in order to transmit a GETSTATES request message and a SAVE request message. However, in order to transmit the GETSTATES request message and the SAVE request message by using the main page 81, the states saving page 82, as illustrated in FIG. 10, must be obtained from the RUI server 6.

FIG. 10 illustrates an example of the syntax representing the states saving page 82 illustrated in FIG. 7. The states saving page 82 of FIG. 10 is an HTML document. Referring to FIG. 10, forms 1 and 2 in the states saving page 82 are respectively used to execute a "SAVE" command and a "GETSTATES" command. Also, a Java script function selectSSS( ) in the states saving page 82, selects the SS server 10 via the SS handler 431 shown in FIG. 5. In particular, the selectSSS( ) function creates a window for selecting an SS server, i.e., a hyperlink to each of a plurality of SS servers. When one of the hyperlinks is clicked, the selectSSS( ) function sets the value of "document.form1.action" based on information regarding an SS server corresponding to the clicked hyperlink. Such Java script functions are well known to those of ordinary skill in the art, and therefore, a detailed description thereof will be omitted.

If the RUI client 4 does not have the RUI CP module 41 and the SS handler 431 and if the RUI server 6 includes the RUI CP module 61 and the SS server selector 66, the RUI server 6 provides a savable page, the syntax of which is shown in FIG. 9, for example, which is different from the savable page whose representative syntax is illustrated in FIG. 8 and FIG. 10.

FIG. 11 illustrates another example of the main page 81 illustrated in FIG. 7. Referring to FIG. 11, the main page 81 is in the form of an HTML document when the RUI server 6 includes the RUI CP module 61 and the SS server selector 66. When the "SAVE" button in the main page 81 is clicked, "getstatesandselect( )" in the main page 81, which is a Java script, is executed in order to execute "window.open( )". Thus, the SS server selector 66 provides a list of SS servers in the form of hyperlinks, and an on-click event handler for each of the hyperlinks corresponding to the SS servers is set to "opener setsssurl(url)". As a result, an action attribute value of the form 1 of the states saving page 82 is changed into information regarding an SS server that a user selects. Likewise, if the RUI server 6 includes the RUI CP module 61 and the SS server selector 66, "selectSSS( )" must be deleted from the states saving page 82, the syntax of which is shown in FIG. 10.

Figure 12:
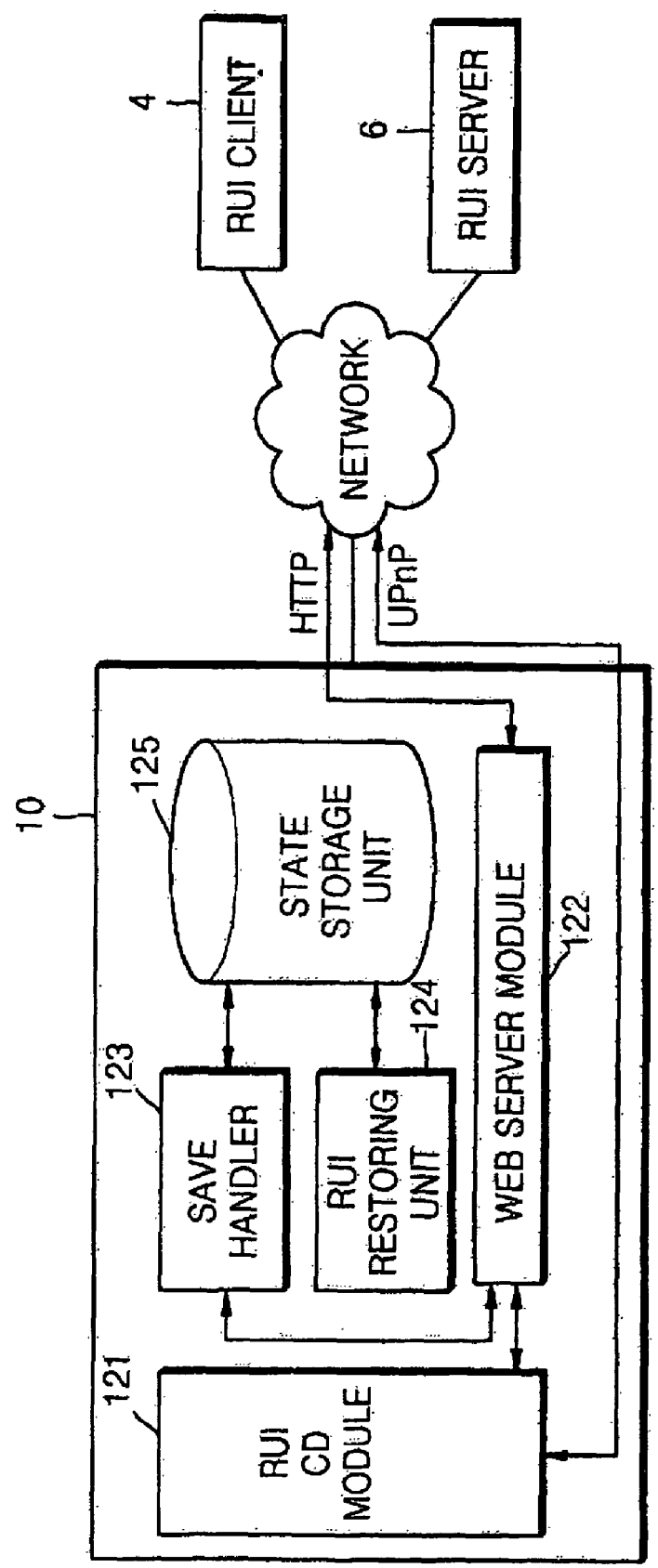
FIG. 12 is a block diagram of an SS server according to an exemplary embodiment of the present invention.

FIG. 12 is a block diagram of the SS server 10 of FIG. 4 or FIG. 6 according to an exemplary embodiment of the present invention. Referring to FIG. 10, the SS server 10 includes an RUI CD module 121, a web server module 122, a save handler 123, an RUI restoring unit 124, and a state storage unit 125.

The RUI CD module 121 advertises that it is a UPnP CD, and acts as a UPnP CD controlled by either the UPnP CP module 41 of the RUI client 4 or the UPnP CP module 61 of the RUI server 6, which discovers the RUI CD module 121 according to the advertisement. That is, the RUI CD module 121 may include information, such as <hasStatesStorage>true</hasStatesStorage>, in a description of the RUI CD module 121 in order to advertise that the SS server 10 has the state storage unit 125 capable of storing state information of a remote interface, i.e., a web page.

The web server module 122 acts as an HTTP-based general web server. That is, the web server module 122 is an HTTP server module that receives a request for an application from the RUI client 4, and processes the application and provides the processing result in response to the request. In particular, the web server module 122 receives and processes commands to save and restore the state information of a web page, which is received from the RUI client 4.

Figure 20:
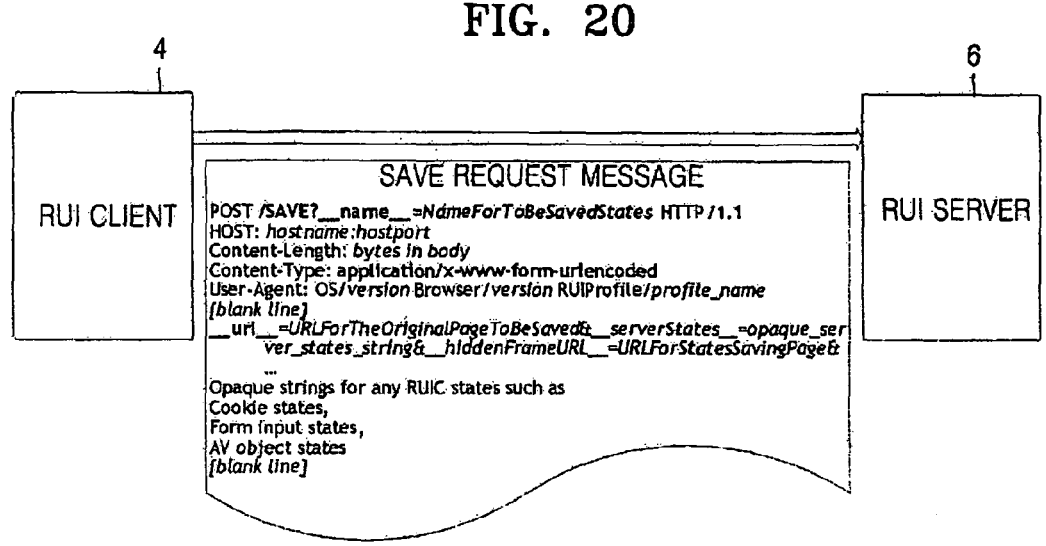
FIG. 20 illustrates the format of a SAVE request message according to an exemplary embodiment of the present invention.

When receiving a SAVE request message such as the one illustrated in FIG. 20 via the web server module 122, the save handler 123 stores all state information of the web page, which is contained in the SAVE request message, i.e., the state of the RUI client 4 and the state information of the RUI server 6, in the state storage unit 125. In particular, when the value of "URLFortheOriginalPageToBeSaved" in the SAVE request message of FIG. 20 is the same as state information stored in the state storage unit 125, the save handler 123 changes the value and then stores the state information of the web page.

The RUI restoring unit 124 allows the RUI client 4 to select and restore state information of the web page desired by a user. More specifically, when receiving a request for a list of restoring pages for web pages from the RUI client 4, the RUI restoring unit 124 provides a list of restoring pages stored in the state storage unit 125 to the RUI client 4. That is, when receiving the restoring page request message illustrated in FIG. 22 from the RUI client 4 via the web server module 122, the RUI restoring unit 124 transmits a restoring page response message illustrated in FIG. 23 in response to the message. Also, if the user selects one of the restoring pages, upon receiving a request for the selected restoring page, the RUI restoring unit 124 provides the selected restoring page. That is, when receiving a restoring request message, as illustrated in FIG. 24, via the web server module 122, the RUI restoring unit 124 transmits a restoring response message illustrated in FIG. 25 to the RUI client 4 in response to the received request message.

Also, when receiving a request for state information for the restoring page provided to the RUI client 4, the RUI restoring unit 124 reads the requested state information from the state storage unit 125 and provides it to the RUI client 4.

The state storage unit 125 stores all the state information of the web page which is received from the RUI client 4, e.g., information regarding cookies generated when the user used RUIs, information regarding forms, AV object information, and the state information of the RUI server 6.

FIG. 13 is a block diagram of a restoring page according to an exemplary embodiment of the present invention. Referring to FIG. 13, the restoring page, which is provided from the SS server 10 when the SS server 10 receives a restoring request message from the RUI client 4, includes an original page 141 and a saved states page 142.

The original page 141 is visible to a user, and is provided from the RUI application module 64 of the RUI server 6.

The saved states page 142 is invisible to the user, and is an HTML document containing cookie information, form information, and AV object information stored in the state storage unit 125. The RUI client 4 reflects the state information of the saved states page 142 in the original page 141, thereby completely restoring the original state of the original page 141 when the RUI client 4 used the original page 141.

FIG. 14 illustrates an example of the syntax representing the restoring page illustrated in FIG. 13. The restoring page of FIG. 14 is an HTML document in the form of a multi-frame. Referring to FIG. 14, the original page 141 is loaded into a frame named "originalpage", and the saved states page 142 is loaded into a frame named "savedstates". In particular, the "savedstates" frame is a hidden frame, thereby preventing a user from viewing the saved states page 142.

Also, "ValueFor_serverStates_" has the same value as the argument value of "_serverStates_" in the SAVE request message illustrated in FIG. 14. Thus, the web browser module 43 of the RUI client 4 receiving the restoring page of FIG. 14 can load the original page 141 received from the RUI server 6 into the "originalpage" frame, and at the same time, provide the RUI server 6 with the state information of the RUI server 6 so that the original page 141 can be restored to its original state when the RUI server 6 used the original page 141.

Also, "_statesAccessPrefix" indicates a Java script access path for allowing a Java script in the original page provided from the RUI server 6 to read the state information of a web page from the saved states page 142, which is loaded into the "savedstates" frame. That is, since it is impossible to recognize the data structure of an HTML document of the saved states page 142 from the SS server 10 by using the Java script in the original page 141 from the RUI server 6, the SS server 10 indirectly provides the saved states page 142 by using a "_statesAccessPrefix_" argument.

Figures 15, 16:
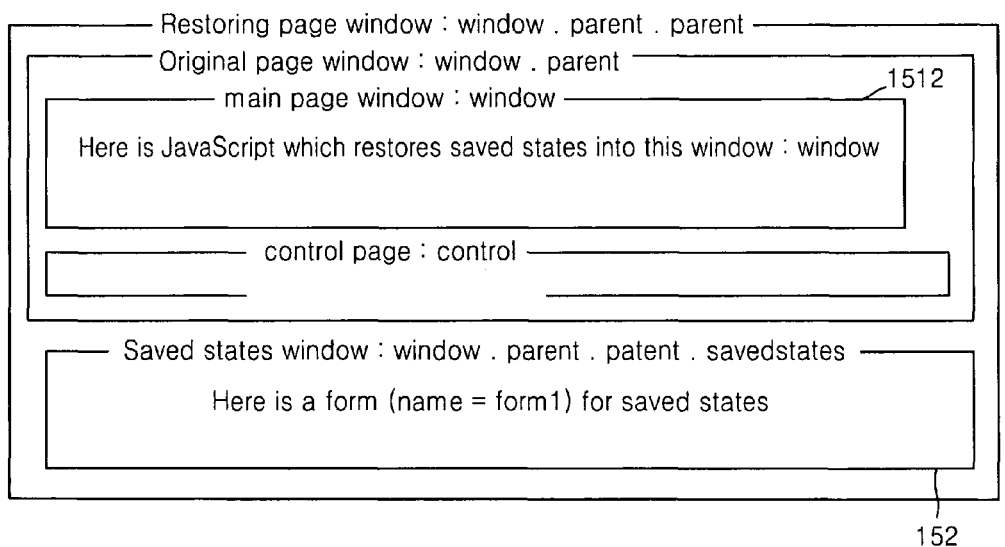
FIG. 15 is a block diagram of a web browser picture obtained after the restoring page of FIG. 14 is loaded.
FIG. 16 is an example of the syntax representing a saved states page to be loaded into a saved states window of FIG. 15.

FIG. 15 is a block diagram of a web browser picture obtained after loading the restoring page, the syntax of which is shown in FIG. 14, according to an exemplary embodiment of the present invention. If the web browser picture illustrated in FIG. 15 is obtained by loading the restoring page, the syntax of which is shown in FIG. 14, the original state of a web page when the state information of the RUI client 4 was saved can be restored by restoring the state information of the RUI client 4. For example, "window.parent.parent.saved-states.form1" must be provided to "_statesAccessPrefix_" in order to restore a form input value used when the state information was saved.

FIG. 16 illustrates an example of the syntax representing the saved sates page 142 to be loaded into the saved states window 152. The saved states page 142, the syntax of which is shown in FIG. 16, is an HTML document. Referring to FIG. 16, the saved sates page 142 contains a form input value.

FIG. 17 is an example of the syntax representing the original page 131 to be loaded into a main page window 1512 illustrated in FIG. 15. The original page 131, the syntax of which is shown in FIG. 17, is an HTML document. Referring to FIG. 17, the main page window 1512 allows the original state of a web page, which was obtained when the state information of the RUI client 4 was saved, to be restored by reading the saved states page 142 illustrated in FIG. 16.

FIG. 18 illustrates the format of a GETSTATES request message according to an exemplary embodiment of the present invention. The GETSTATES request message of FIG. 18 is a type of HTTP GET request message. Referring to FIG. 18, in order to request the state information of the RUI server 6, the name "GETSTATES" that is the URL of the state information of the RUI server 6 is input in a GET request line. However, it would be apparent to those of ordinary skill in the art that a name other than "GETSTATES" may be used. Also, a user agent header contains "Protocol/version(capability_string)" indicating that the RUI client 4 can support an HTTP-based remote user interface, and may contain ">hasControlPoint>ture;>/hasControlPoint>" indicating that the RUI client 4 includes the RUI CP module 41, although this is not shown in FIG. 5. In particular, ">hasControlPoint>ture>/hasControlPoint>" is a string allowing an extensible markup language (XML) fragment, such as "<hasControlPoint>ture</hasControlPoint>", to be escaped from an URL.

Figure 19:
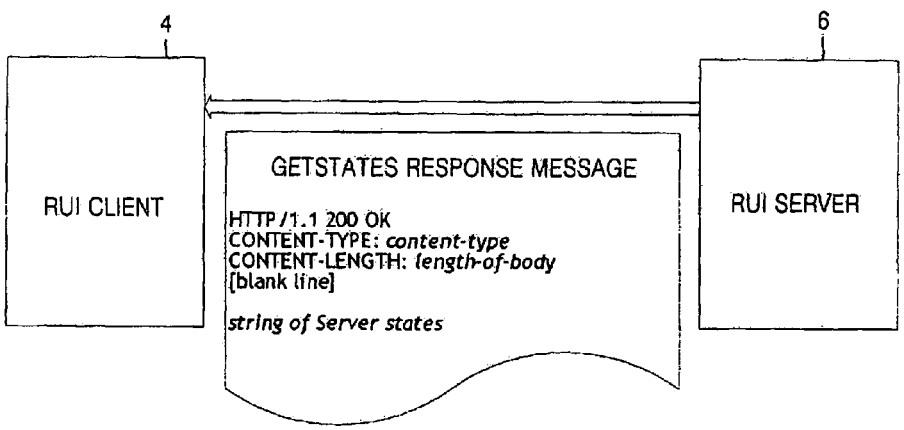
FIG. 19 illustrates the format of a GETSTATES response message according to an exemplary embodiment of the present invention.

FIG. 19 illustrates the format of a GETSTATES response message according to an exemplary embodiment of the present invention. The GETSTATES response message illustrated in FIG. 19 is a type of HTTP GET response message. Referring to FIG. 19, a content type field in the GETSTATES response message records the content type value of the state information of the RUI server 6. The content type value may be text/plain or application/x-www-url-encoded. Also, a field containing a string of server states in the GETSTATES response message records a state information value of the RUI server 6. Here, the state information value of the RUI server 6 must be determined in order to be interpreted by a Java script in a web page, which is provided by the RUI application module 64 of the RUI server 6.

FIG. 20 illustrates the format of a SAVE request message according to an exemplary embodiment of the present invention. The SAVE request message illustrated in FIG. 20 is a type of HTTP GET request message. Referring to FIG. 20, "/SAVE" of a "POST /SAVE?_name_=NameForToBeSavedStates" field is a command to save the state information of an RUI, which is generated by the RUI application module 64. A "?_name_=NameForToBeSavedStates" of the "POST /SAVE?_name_=NameForToBeSavedStates" field indicates the name of a web page to be stored in the SS server 10, and must be set to have a unique value. For example, the unique name may be "<title>tag+saved time". If a web page having the same name as the indicated name has already been stored in the state storage unit 125 of the SS server 10 receiving this message indicating the name of the web page, the indicated name is renamed and stored.

A "Content-Type: application/x-www-form-urlencoded" field represents a multipurpose Internet mail extensions (MIME) type of body content of the SAVE request message, the format of which should be fixed so that the SS server 10 can understand it. Also, an "_url_=URLForTheOriginalPageToBeSaved&_serverStates_=opaque_server_states_string&_hiddenFrameURL_=URLForStatesSavingPage&" field, which is a part of the body content of the SAVE request message, indicates the URL of the original page 141, as shown in FIG. 13, generated by the RUI application module 64 of the RUI server 6, and the state information of the RUI server 6. In particular, the value of "_serverStates_" is interpreted by the SS server 10 and thus may be set as the RUI server 6 desires. However, keys of the "_url_=URLForTheOriginalPageToBeSaved&_serverStates_=opaque_server_states_string&_hiddenFrameURL_=URLForStatesSavingPage&" field, i.e., "_url_", "_serverStates_", and "hiddenFrameURL_", must be predetermined between the RUI server 6 and the SS server 10 so that the SS server 10 can understand the keys.

An "Opaque strings for any RUIC states" field represents the state information of RUI client 4, e.g., cookie information, form input information, AV object state information. Since these strings are also the state information of the RUI client 4, key values of these strings need not be set to be understood by the SS server 10, unlike in the case of "_url_", "_serverStates_", and "_hiddenFrameURL_". That is, the key values of these strings may be set so that only the RUI server 6 can understand them.

Figure 21:
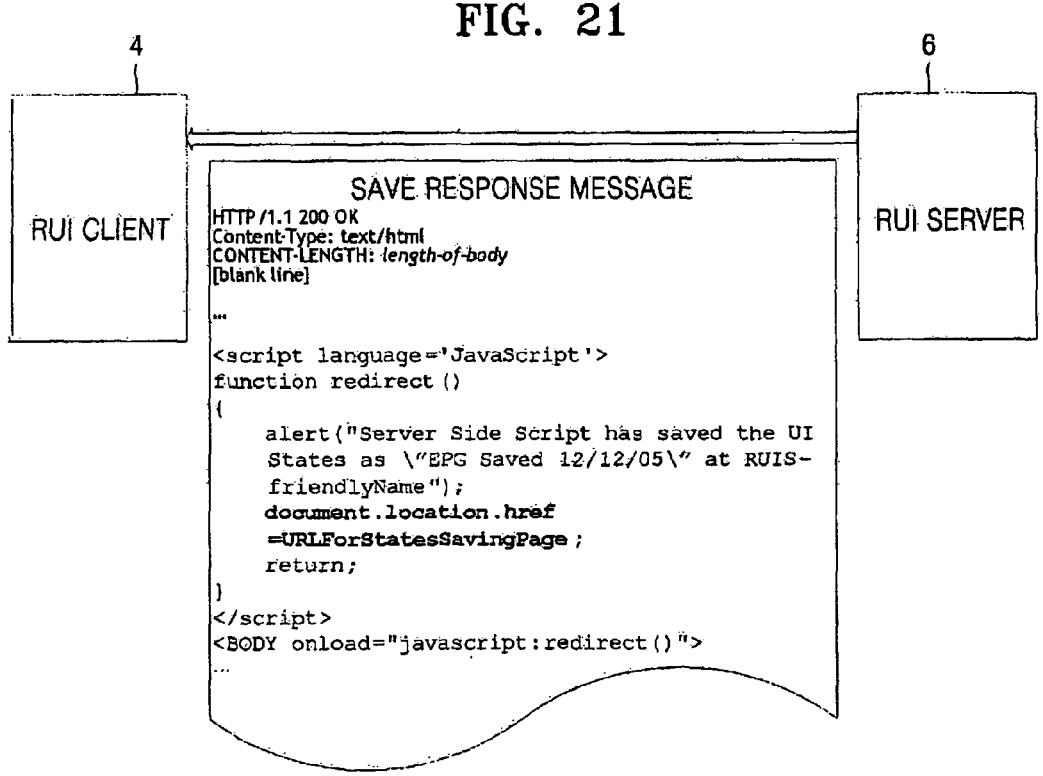
FIG. 21 illustrates the format of a SAVE response message according to an exemplary embodiment of the present invention.

FIG. 21 illustrates the format of a SAVE response message according to an exemplary embodiment of the present invention. The SAVE response message of FIG. 21 is a type of HTTP GET response message. Referring to FIG. 21, "redirect( )" is a Java script that is executed immediately after the loading of an HTML document containing "redirect( )" is completed, which is specified in an onload event in a body tag. In order to continuously store the state information of a web page, "redirect( )" reloads the original states saving page 82 by using a location object. In particular, a "URLForStatesSavingPage" value allocated to the "href property" of the location object is the same as a "_hiddenFrameURL_" value of the SAVE request message.

Figure 22:
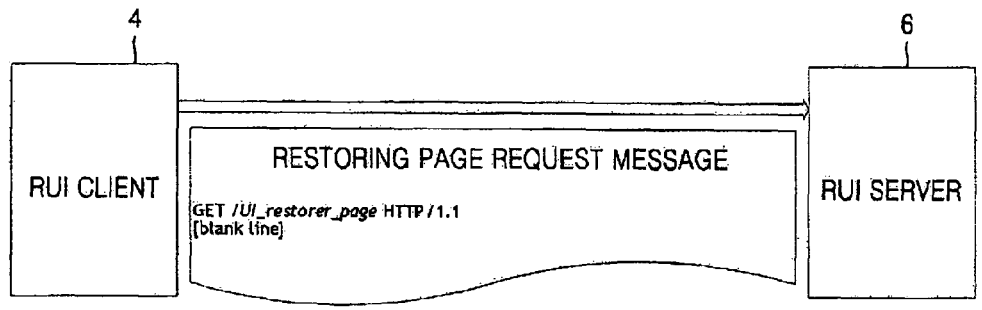
FIG. 22 illustrates the format of a restoring page request message according to an exemplary embodiment of the present invention.

FIG. 22 illustrates the format of a restoring page request message according to an exemplary embodiment of the present invention. The restoring page request message of FIG. 21 is a type of HTTP GET request message. A list of restoring pages may be provided in the form of an XML-based list included in the description of the SS server 10. For example, the XML-based list may be described in the form of "A_ARG_TYPE_CompatibleUIs", that is, a return value of "GetCompatibleAction( )" of the RUI server 6. In this case, one of the restoring pages may be recognized from an "<uri>" element following a protocol element of each state information element of "A_ARG_TYPE_CompatibleUIs".

Figure 23:
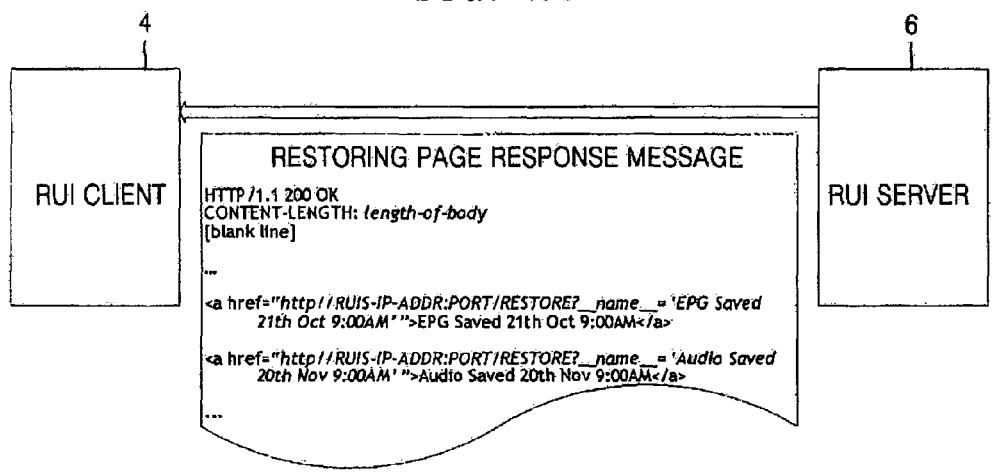
FIG. 23 illustrates the format of a restoring page response message according to an exemplary embodiment of the present invention.
Figure 24:
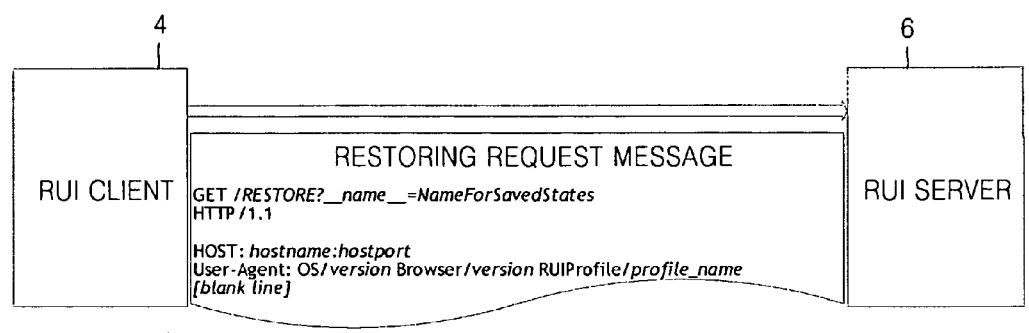
FIG. 24 illustrates the format of a restoring request message according to an exemplary embodiment of the present invention.

FIG. 23 illustrates the format of a restoring page response message according to an exemplary embodiment of the present invention. The restoring page response message of FIG. 23 is a type of HTTP GET response message. Referring to FIG. 23, the restoring page response message indicates the location information, i.e., the URLs, of restoring pages managed by the SS server 10. Thus, a user can select a desired restoring page based on the names of the restoring pages. The restoring pages may either be stored before the SS server 10 processes the SAVE request message or be created when the restoring page request message is received from the RUI client 4.

FIG. 24 illustrates the format of a restoring request message according to an exemplary embodiment of the present invention. The restoring request message of FIG. 24 is a type of HTTP GET request message. Referring to FIG. 24, "/RESTORE" of a GET request line identifies the restoring request message. Also, "?_name_=NameForSavedStates" denotes the name of state information stored in the state storage unit 125 of the SS server 10.

Figure 25:
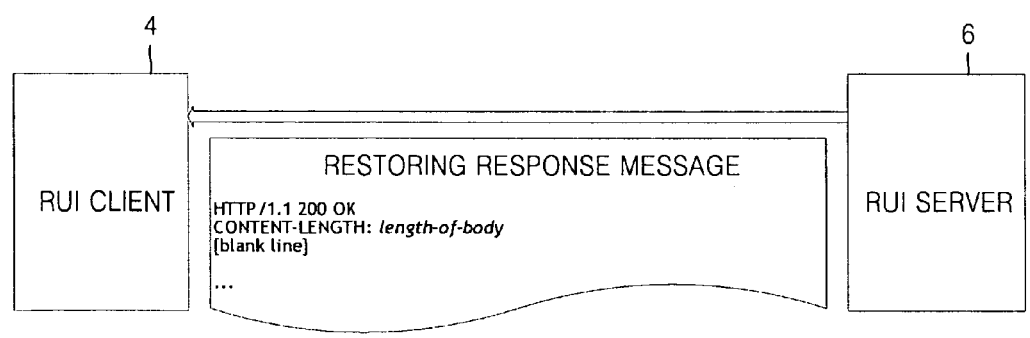
FIG. 25 illustrates the format of a restoring response message according to an exemplary embodiment of the present invention.

FIG. 25 illustrates the format of a restoring response message according to an exemplary embodiment of the present invention. The restoring response message of FIG. 25 is a type of HTTP GET response message. Referring to FIG. 25, the restoring page illustrated in FIG. 13 is contained in the body of this message.

Figure 26:
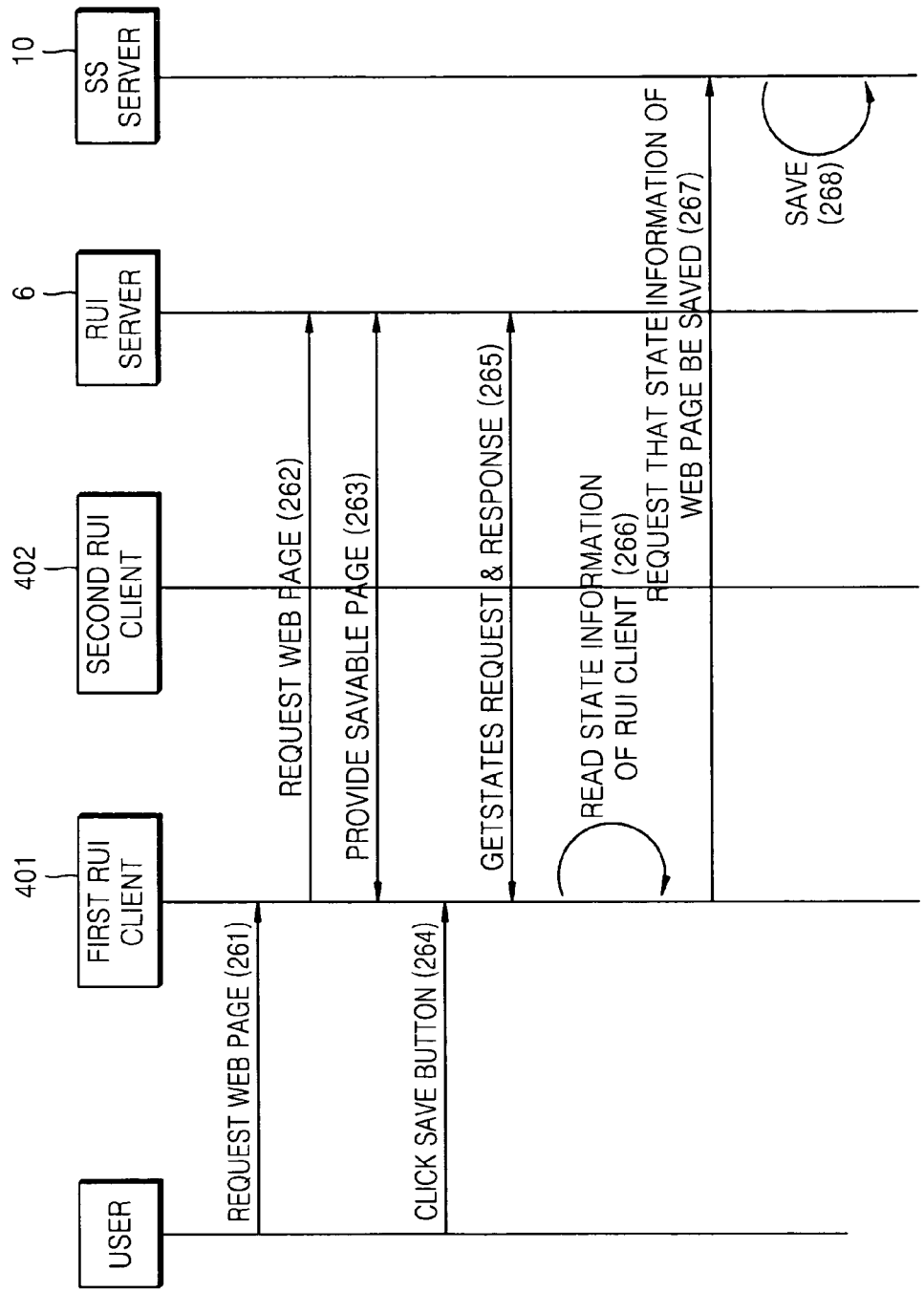
FIG. 26 is a timing diagram of a method of storing state information of an RUI according to an exemplary embodiment of the present invention.

FIG. 26 is a timing diagram of a method of storing the state information of an RUI according to an exemplary embodiment of the present invention. The method of FIG. 26 is comprised of timing operations performed by the RUI client 4 illustrated in FIG. 4, the RUI server 6 illustrated in FIG. 6, and the SS server 10 illustrated in FIG. 12. Therefore, although not described here, the above operations of the RUI client 4 illustrated in FIG. 4, the RUI server 6 illustrated in FIG. 6, and the SS server 10 illustrated in FIG. 12 are also applicable to the method illustrated in FIG. 26.

However, since a method of storing an RUI according to an exemplary embodiment of the present invention is applied to two RUI clients, the RUI client 4 illustrated in FIG. 4 will be divided into the first RUI client 401 and the second RUI client 402 for convenience. The first RUI client 401 and the second RUI client 402 are generally separate RUI clients, but they may be regarded as a single RUI client. For example, in the former case, a user uses a web page in a plurality of RUI clients, and in the latter case, the user sequentially uses a first web page, a second web page, and the first web page in only a single RUI client.

In operation 261, the first RUI client 401 receives a request from a user for a web page corresponding to an RUI.

In operation 262, the first RUI client 401 requests the RUI server 6 to provide the web page requested in operation 261.

In operation 263, the RUI server 6 provides the web page requested in operation 262 to the first RUI client 401. Here, the web page provided from the RUI server 6 is a savable page containing a unit, i.e., a SAVE button, whereby the user can save the state information of the web page.

In operation 264, the first RUI client 401 receives a command to save the state information of the web page, when the user clicks the save button.

In operation 265, the first RUI client 401 transmits a GETSTATES request message to the RUI server 6 in order to request the RUI server 6 to provide the state information. Next, the RUI server 6 receives the GETSTATES request message, and transmits a GETSTATES response message in response to the GETSTATES request message. Next, the first RUI client 401 receives the GETSTATES response message, and obtains the state information of the RUI server 6 contained in the GETSTATES response message. Operation 265 is optional and is needed when the RUI server 6 manages the state information of RUIs.

In operation 266, the first RUI client 401 reads from the web page the state information of the first RUI client 401, which is generated when the user uses the web page.

In operation 267, the first RUI client 1 401 transmits a SAVE request message to the SS server 10 in order to request the SS server 10 to save the state information of the web page.

In operation 268, the SS server 10 receives the SAVE request message, and stores the state information of the web page, which is included in the received message, in the state storage unit 125.

Figure 27:
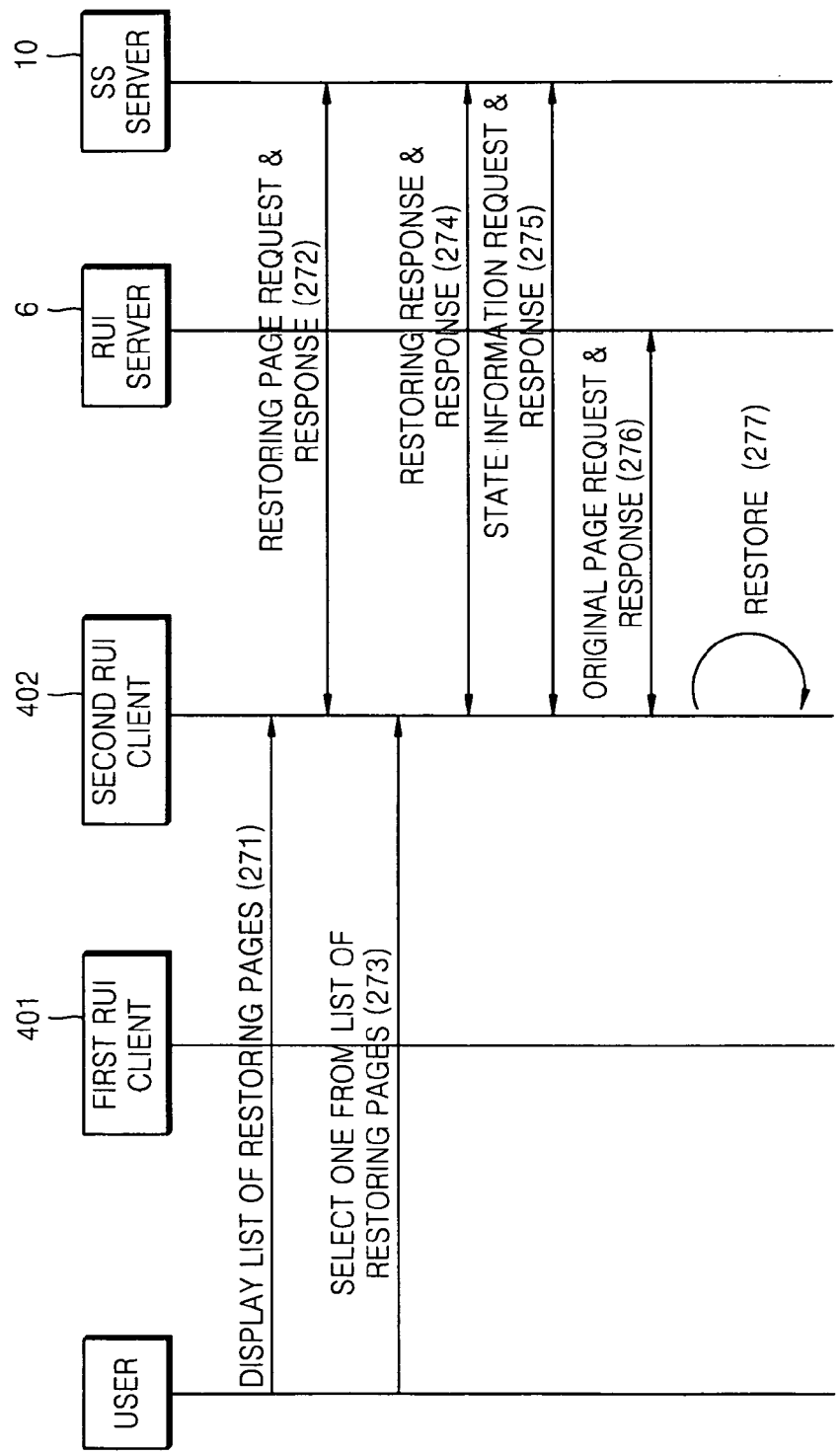
FIG. 27 is a timing diagram of a method of restoring state information of an RUI according to an exemplary embodiment of the present invention.

FIG. 27 is a timing diagram of a method of restoring the state information of an RUI according to an exemplary embodiment of the present invention. The method of FIG. 27 is comprised of timing operations performed by the RUI client 4 illustrated in FIG. 4, the RUI server 6 illustrated in FIG. 6, and the SS server 10 illustrated in FIG. 12. Therefore, although not described here, the above operations of the RUI client 4 illustrated in FIG. 4, the RUI server 6 illustrated in FIG. 6, and the SS server 10 illustrated in FIG. 12 are also applicable to the method illustrated in FIG. 18. In particular, the method illustrated in FIG. 19 is performed after all the operations of the method illustrated in FIG. 26 are completed.

In operation 271, the second RUI client 402 receives from a user a command to display a list of restoring pages.

In operation 272, the second RUI client 402 transmits a restoring page request message to the SS server 10 in order to request the list of restoring pages. Next, the SS server 10 receives the restoring page request message, and transmits a restoring page response message in response to the restoring page request message. Next, the second RUI client 402 receives the restoring page response message, and obtains the list of restoring pages from the received message. Next, the second RUI client 402 displays the list of restoring pages to the user.

In operation 273, the second RUI client 402 receives the user's input indicating that one of the restoring pages from the list of restoring pages has been selected by the user.

In operation 274, the second RUI 402 transmits a restoring request message to the SS server 10 in order to request the SS server 10 to provide the restoring page selected in operation 273. Next, the SS server 10 receives the restoring request message, and transmits a restoring response message in response to the restoring request message. Next, the second RUI client 402 receives the restoring response message and obtains the restoring page from the restoring response message.

In operation 275, the second RUI client 402 requests the SS server 10 to provide state information for the restoring page. Next, the SS server 10 transmits the requested state information to the second RUI client 402 in response to the request. Next, the second RUI client 402 obtains the requested state information.

In operation 276, the second RUI client 402 requests the RUI server 6 to provide the original page 141. In this case, the second RUI client 402 provides the RUI server 6 with the state information of the RUI server 6, and information for accessing the state information of the RUI client 4 so that the RUI server 6 can restore the state information of a web page. Next, the RUI server 6 restores its state, accesses the state information of the second RUI client 402 by using the information for accessing the state information of the second RUI client 402 in order to create an original page containing a Java script for restoring the state of the second RUI client 402, and transmits the original page to the second RUI client 402. Then, the second RUI client 402 obtains the original page 141 as a response to the request.

In operation 277, the second RUI client 402 restores the state of the web page by reflecting the state information, obtained in operation 275, in the original page 141, by using the Java script in the original page 141.

Figure 28:
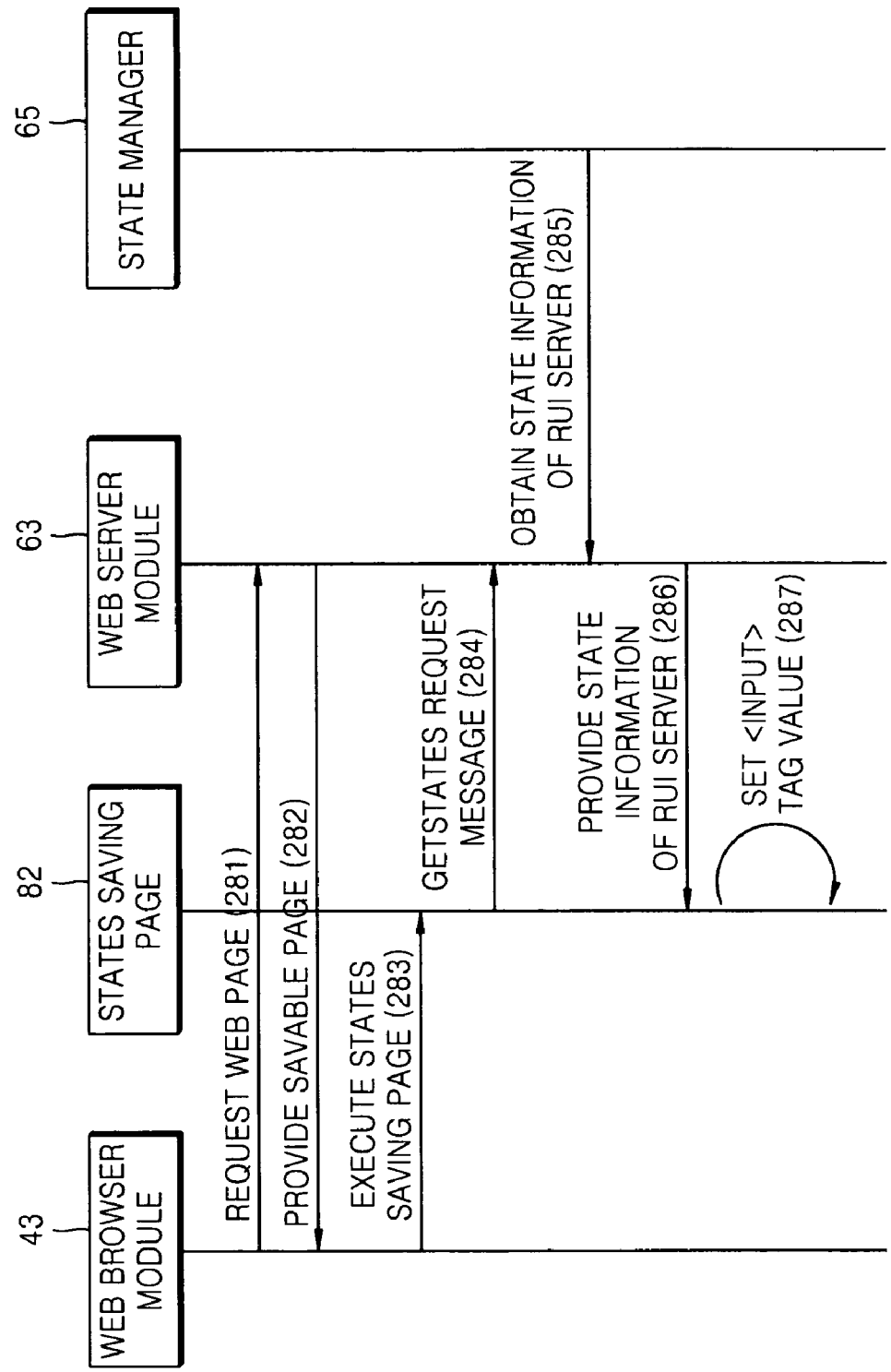
FIG. 28 is a detailed timing diagram of a method of obtaining state information of an RUI according to an exemplary embodiment of the present invention.

FIG. 28 is a detailed timing diagram of a method of obtaining the state information of the RUI server 6 according to an exemplary embodiment of the present invention. The method of FIG. 28 is comprised of timing operations performed by the RUI client 4 illustrated in FIG. 4 and the RUI server 6 illustrated in FIG. 6. Therefore, although not described here, the above operations of the RUI client 4 illustrated in FIG. 4 and the RUI server 6 illustrated in FIG. 6 are also applicable to the method illustrated in FIG. 28.

In operation 281, the web browser module 43 requests the web server module 63 to provide a web page.

In operation 282, the web server module 63 provides the web browser module 43 with a savable page containing a "SAVE" button.

In operation 283, when a user clicks the "SAVE" button in the main page 81, the web browser module 43 executes the states saving page 82. However, the main page 81 may be executed according to a Java script provided from the RUI server 6.

In operation 284, the states saving page 82 transmits a GETSTATES request message to the web server module 63.

In operation 285, the web server module 63 receives the state information of the RUI server 6 from the state manager 65.

In operation 286, the web server module 63 provides the state information of the RUI server 6 to the states saving page 82.

In operation 287, the states saving page 82 sets the state information of the RUI server 6 as the value of an <input> tag illustrated in the states saving page 82 shown in FIG. 10 in order to use the state information for transmitting a SAVE request message.

Figure 29:
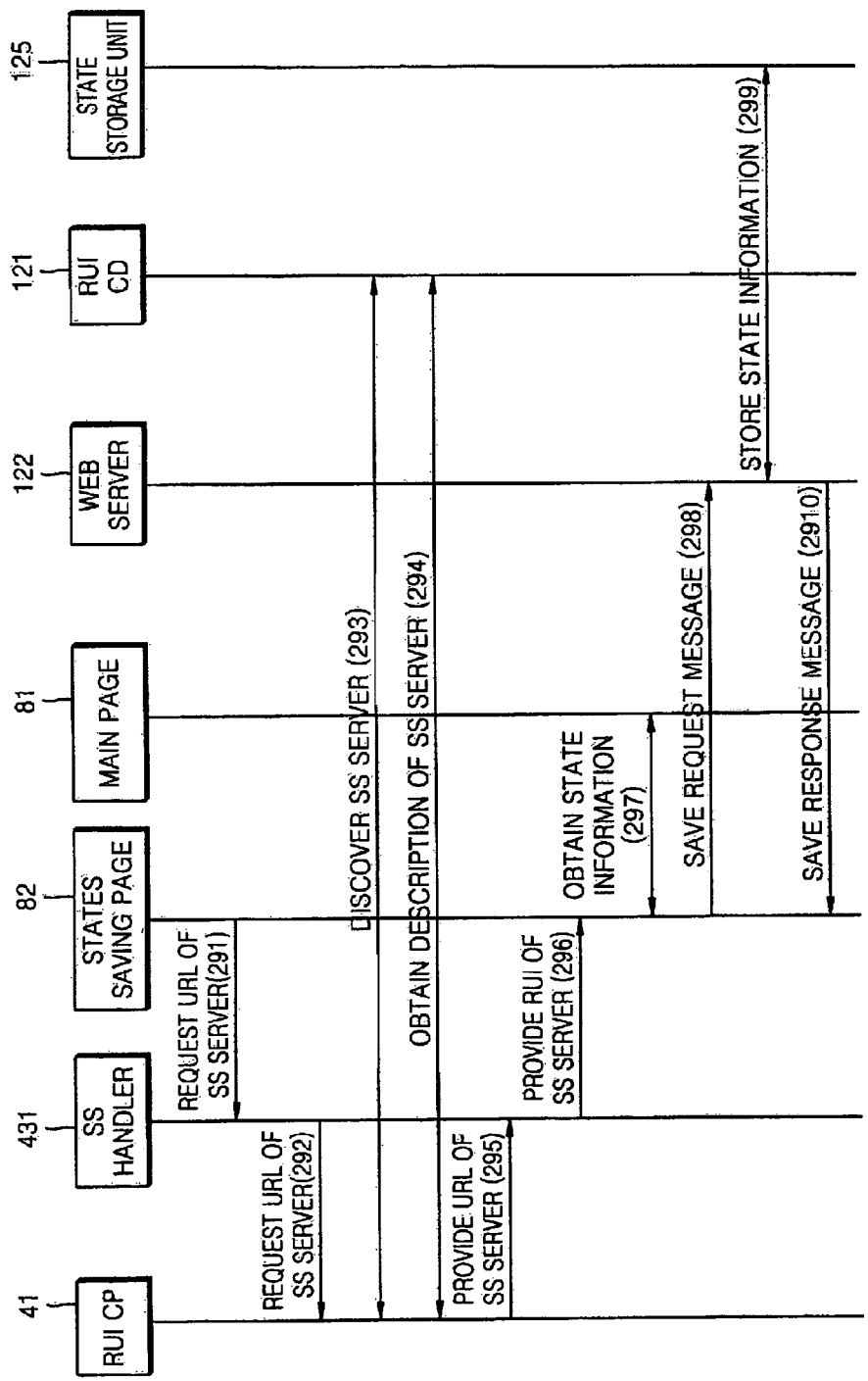
FIG. 29 is a detailed timing diagram of a method of saving state information of an RUI according to an exemplary embodiment of the present invention.

FIG. 29 is a detailed timing diagram of a method of saving the state information of a web page according to an exemplary embodiment of the present invention. The method of FIG. 29 is comprised of timing operations performed by the RUI client 4 illustrated in FIG. 4, the RUI server 6 illustrated in FIG. 6, and the SS server 10 illustrated in FIG. 12. Therefore, although not described here, the above operations of the RUI client 4, the RUI server 6, and the SS server 10 are also applicable to the method illustrated in FIG. 29.

In operation 291, in the states saving page 82 or the main page 81, the SS handler 431 is requested to provide information about the SS server 10, i.e., the URL of the SS server 10. Whether the states saving page 82 or the main page 81 is used to request the information of the SS server 10 is determined according to the type of savable page provided from the RUI server 6. Hereinafter, the method of FIG. 29 will be described according to the case where the states saving page 82 is used. It would be apparent to those of ordinary skill in the art that the method of FIG. 29 is applied similarly in the case where the main page 81 is used.

In operation 292, the SS handler 431 requests the RUI CP module 41 to provide the URL of the SS server 10.

In operation 293 the RUI CP module 41 discovers the SS server 10 by UPnP discovery.

In operation 294, the RUI CP module 41 obtains the description of the SS server 10 discovered in operation 293. In particular, if the description of the SS server 10 reveals that the state storage unit 125 is provided in order to store state information, the SS server 10 is regarded as a storage server providing the state storage unit 125 capable of storing state information. If the RUI CP module 41 has already stored the description of the SS server 10 operations 293 and 294 are skipped.

In operation 295, the RUI CP module 41 provides the URL of the SS server 10 to the SS handler 431.

In operation 296, the SS handler 431 provides the URL of the SS server 10 to the states saving page 82.

In operation 297, the states saving page 82 reads the state information of the main page 81 from the main page 81 in order to obtain the state information of the RUI client 4, and also obtains the state information of the RUI server 6.

In operation 298, the states saving page 82 transmits a SAVE request message to the web server module 122.

In operation 299, the web server module 122 stores the state information obtained in operation 297 in the state storage unit 125.

In operation 2910, the web server module 122 transmits a SAVE response message to the states saving page 82 in response to the SAVE request message.

Figure 30:
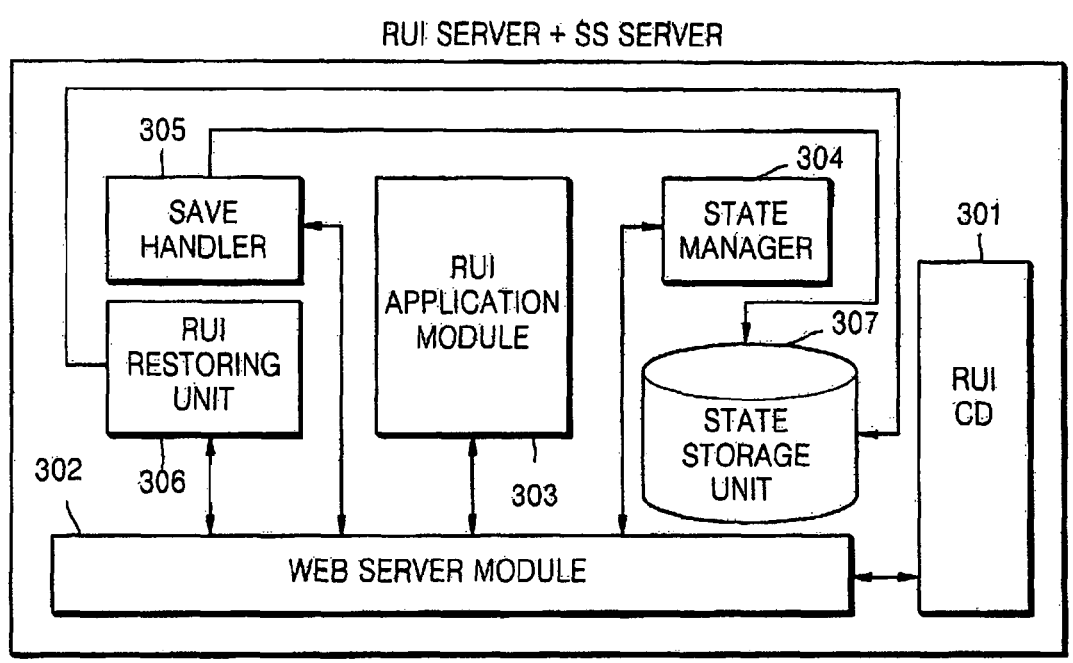
FIG. 30 is a block diagram of an apparatus that is a combination of the RUI server of FIG. 6 and the SS server of FIG. 12 according to an exemplary embodiment of the present invention.

FIG. 30 is a block diagram of an apparatus that is a combination of the RUI server 6 of FIG. 6 and the SS server 10 of FIG. 12 according to an exemplary embodiment of the present invention. The apparatus of FIG. 30 includes an RUI CD module 301, a web server module 302, an RUI application module 303, a state manager 304, a save handler 305, an RUI restoring unit 306, and a state storage unit 307. Since the functions of the RUI server 6 and the SS server 10 are combined in the apparatus of FIG. 30, a process of selecting an SS server is not needed, and thus, the SS server selector 66 illustrated in FIG. 6 is not included in the apparatus illustrated in FIG. 30. It would be apparent to those of ordinary skill in the art that the present invention is not limited to the construction of the apparatus of FIG. 30, that is, it is possible to design the apparatus in various ways based on the above described exemplary embodiments of the present invention.

The above exemplary embodiments of the present invention can be embodied as a program that can be executed by a computer system, and executed by a general digital computer via a computer readable medium or via carrier waves (such as in transmission over the Internet). Also, data constructions used in the above embodiments can be recorded in a computer readable medium or in carrier waves via various devices.

Examples of the computer readable medium include a magnetic recording medium (a ROM, a floppy disk, a hard disc, etc.), an optical recording medium (a CD-ROM, a DVD, etc.).

According to exemplary embodiments of the present invention, an RUI client requests an external storage server to store the state information of an RUI, and restores the original state of the RUI by using the stored state information. Accordingly, a method of storing and restoring the state information of an RUI, in a UPnP environment, according to exemplary embodiments of the present invention, is applicable to an HTTP-based remote protocol model having stateless characteristics that do not allow the state information of an RUI to be saved.

Furthermore, the exemplary embodiments of the present invention allow a user to select a desired storage server for storing the state information of a RUI. Also, according to the exemplary embodiments of the present invention, a user can select a web page to be restored from a list of restoring pages, the state information of which is stored in a storage server.

While this invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method of allowing a client, which receives a remote user interface from a server, to request saving of state information of the remote user interface, the method comprising:
at the client, obtaining by the computer the state information generated when the remote user interface is used; and
at the client, requesting that the obtained state information is saved,
wherein the state information includes client state information which is state information obtained from the remote user interface and server state information which is state information remaining in the server,
wherein the obtaining of said state information comprises:
at the client, obtaining the server state information from the server; and
at the client, obtaining the client state information from the remote user interface,
wherein the obtaining and the requesting by the client is executed via HTTP protocol,
wherein the remote user interface is transmitted from the server to the client via the HTTP protocol,
wherein the client requests that the server state information and the client state information are saved in same storage unit, and
wherein the requesting comprises the client requesting that both the obtained server state information and the obtained client state information are saved.

2. The method of claim 1, wherein the requesting the saving of the obtained state information comprises requesting a storage server, which provides a storage for storing the state information, to save the obtained state information.

3. The method of claim 2, further comprising selecting the storage server as a storage server for saving the obtained state information,
wherein the requesting the saving of the obtained state information comprises requesting the storage server to save the obtained state information by using information about the selected storage server.

4. The method of claim 1, when a command to save the state information of the server is, further comprising requesting the server to provide the state information of the server,
wherein the obtaining of the server state information comprises obtaining the server state information from a response to the request.

5. The method of claim 1, wherein the obtaining of the client state information comprises obtaining the state information of the client by reading the state information of the client from the remote user interface.

6. The method of claim 1, wherein the server provides the client with a remote user interface based on a stateless protocol which does not allow the state information to be saved.

7. The method of claim 1, wherein the remote user interface is a web page based on a hypertext transfer protocol.

8. A non-transitory computer readable medium having recorded thereon a program for executing a method of allowing a client, which receives a remote user interface from a server, to request saving of state information of the remote user interface, the method comprising:
at the client, obtaining state information generated when the remote user interface is used; and
at the client, requesting that the obtained state information is saved,
wherein the state information includes client state information which is state information obtained from the remote user interface and server state information which is state information remaining in the server,
wherein the obtaining of said state information comprises:
at the client, obtaining the server state information from the server; and
at the client, obtaining the client state information from the remote user interface,
wherein the obtaining and the requesting by the client is executed via HTTP protocol,
wherein the remote user interface is transmitted from the server to the client via the HTTP protocol,
wherein the client requests that the server state information and the client state information are saved in same storage unit, and
wherein the requesting comprises the client requesting that both the obtained server state information and the obtained client state information are saved.

9. An apparatus of a client, which uses a remote user interface received from a server, to request that state information of the remote user interface be saved, the apparatus comprising:
a memory storing a remote user interface control point module;
a processor executing the remote user interface control point module which obtains information of a storage server providing storage for saving the state information; and
a web browser which requests the storage server to save the state information, based on the information about the storage server obtained by the remote user interface control point module,
wherein the state information includes client state information which is state information obtained from the remote user interface and server state information which is state information remaining in the server, and
wherein the web browser obtains the server state information from the server and obtains the client state information from the remote user interface,
wherein the obtaining by the web browser and the requesting by the client is executed via HTTP protocol,
wherein the remote user interface is transmitted from the server to the client via the HTTP protocol,
the client requests that the server state information and the client state information are saved in same storage unit, and
wherein the requesting comprises the client requesting that both the obtained server state information and the obtained client state information are saved.

10. The apparatus of claim 9, wherein the web browser obtains state information generated when the client uses the remote user interface, and requests that the obtained state information be saved.

11. The apparatus of claim 9, wherein the remote user interface control point module obtains the information of the storage server during universal plug and play discovery.

12. The apparatus of claim 9, wherein the remote user interface is based on a stateless protocol which does not allow the state information to be saved.

13. The apparatus of claim 9, wherein the remote user interface is a web page based on a hypertext transfer protocol.

14. A method of restoring state information of a remote user interface by using a client which receives the remote user interface from a server implemented on a computer, the method comprising:

obtaining by the computer the state information generated when the remote user interface is used; and
providing by the computer the obtained state information in the remote user interface,
wherein the state information includes client state information which is state information obtained from the remote user interface and server state information which is state information remaining in the server;
wherein the obtaining of said state information comprises:
at the client, obtaining the server state information from the server; and
at the client, obtaining the client state information from the remote user interface,
wherein the obtaining and the requesting by the client is executed via HTTP protocol,
wherein the remote user interface is transmitted from the server to the client via the HTTP protocol,
wherein the client requests that the server state information and the client state information are saved in same storage unit, and
wherein the requesting comprises the client requesting that both the obtained server state information and the obtained client state information are saved.

15. The method of claim 14, wherein the obtaining of the state information comprises obtaining the state information from a storage server which stores the state information.

16. The method of claim 14, wherein the obtaining of the state information comprises obtaining the client state information generated when the remote user interface is used, and
providing the obtained client state information in the remote user interface.

17. The method of claim 14, wherein the obtaining of the state information comprises obtaining the server state information generated when the remote user interface is used,
providing the obtained server state information to the server.

18. The method of claim 14, wherein the remote user interface is based on a stateless protocol which does not allow the state information to be saved.

19. The method of claim 14, wherein the remote user interface is a web page based on a hypertext transfer protocol.

20. The method of claim 19, further comprising displaying to a user a list of restoring pages for web pages, and allowing a user who recognizes the displayed list of restoring pages to select one restoring page from the list of restoring pages,
wherein the obtaining of the state information comprises obtaining state information for the selected restoring page.

21. The method of claim 19, further comprising requesting the server to provide an original page containing a predetermined Java script,
wherein the providing of the obtained state information comprises allowing the predetermined Java script to provide the obtained state information in the original page.

22. A non-transitory computer readable medium having recorded thereon a program for executing a method of allowing a client, which receives a remote user interface from a server, to restore state information of the remote user interface, the method comprising:
obtaining state information generated when the remote user interface is used; and
providing the obtained state information in the remote user interface,
wherein the state information includes client state information which is state information obtained from the remote user interface and server state information which is state information remaining in the server,
wherein the obtaining of said state information comprises:
at the client, obtaining the server state information from the server; and
at the client, obtaining the client state information from the remote user interface,
wherein the obtaining and the requesting by the client is executed via HTTP protocol,
wherein the remote user interface is transmitted from the server to the client via the HTTP protocol,
wherein the client requests that the server state information and the client state information are saved in same storage unit, and
wherein the requesting comprises the client requesting that both the obtained server state information and the obtained client state information are saved.

23. An apparatus of a client, which receives a remote user interface from a server, to restore state information of the remote user interface, the apparatus comprising:
a memory storing a remote user interface control point module;
a processor executing the remote user interface control point module which obtains information of a storage server which stores the state information; and
a web browser which obtains the state information from the storage server based on the information about the storage server, which is obtained by the remote user interface control point module, and providing the obtained state information in the remote user interface,
wherein the state information includes client state information which is state information obtained from the remote user interface and server state information which is state information remaining in the server,
wherein the web browser obtains the server state information from the server and obtains the client state information generated from the remote user interface,
wherein the obtaining by the web browser and the requesting by the client is executed via HTTP protocol,
wherein the remote user interface is transmitted from the server to the client via the HTTP protocol,
wherein the client requests that the server state information and the client state information are saved in same storage unit, and
wherein the requesting comprises the client requesting that both the obtained server state information and the obtained client state information are saved.

24. The apparatus of claim 23, wherein the web browser requests the storage server to provide state information generated when the client uses the remote user interface, and obtains the state information from a response to the request.

25. The apparatus of claim 23, wherein the remote user interface control point module obtains information about the storage server during universal plug and play discovery.

26. The apparatus of claim 23, wherein the remote user interface is based on a stateless protocol which does not allow the state information to be saved.

27. The apparatus of claim 23, wherein the remote user interface is a web page based on a hypertext transfer protocol.

28. The method of claim 1, wherein the server comprises:
a web server module which provides web pages to the client;
a state manager which communicates with the web server module to obtain state information of the web pages; and
a state saving server selector which selects one of a state saving servers for storing the state information.

29. The method of claim 28, wherein the client comprises:
a web browser module which communicates with the web server module to obtain and display the web pages, wherein the web browser module comprises a state saving server handler that is a Java script that obtains information regarding the state saving server and provides the obtained information to a state saving page based on a user request.

30. The method of claim 1, wherein:
the state information is state information of a web page,
the web page is a savable page comprising a visible main page and an invisible state saving page,
the visible main page comprises a user interface item that permits the user to request the storing the state information, and
the invisible state saving page is loaded into a control frame and comprises a Java script that requests storing of the visible main page in a state saving server.

31. The method of claim 1, wherein the obtaining comprises obtaining by the computer the state information generated and the requesting comprises requesting by a user that the obtained state information is saved,
further comprising requesting by the client that the obtained state information is saved based on the user request.

32. The method of claim 1, further comprising receiving user selection regarding which portions of the state information are to be save via selection of web pages provided on a list of web pages displayed to the user and requesting by the client that the obtained state information is saved based on the user selection.

* * * * *